US012568305B2

(12) United States Patent
Kim et al.

(10) Patent No.:    US 12,568,305 B2
(45) Date of Patent:        Mar. 3, 2026

(54) METHOD AND ELECTRONIC DEVICE FOR GENERATING POINT CLOUD

(71) Applicant: SAMSUNG ELECTRONICS CO., LTD., Suwon-si (KR)

(72) Inventors: Dongchan Kim, Suwon-si (KR); Dongnam Byun, Suwon-si (KR); Jaewook Shin, Suwon-si (KR); Jinyoung Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 35 days.

(21) Appl. No.: 18/373,747

(22) Filed: Sep. 27, 2023

(65) Prior Publication Data

US 2024/0137646 A1      Apr. 25, 2024

Related U.S. Application Data

(63) Continuation of application No. PCT/KR2023/013731, filed on Sep. 13, 2023.

(30) Foreign Application Priority Data

Oct. 7, 2022    (KR) ......................... 10-2022-0129053
Feb. 28, 2023   (KR) ......................... 10-2023-0026906

(51) Int. Cl.
| | |
|---|---|
| *H04N 23/60* | (2023.01) |
| *G06T 7/246* | (2017.01) |
| *G06T 7/55* | (2017.01) |
| *G06T 7/73* | (2017.01) |
| *H04N 23/63* | (2023.01) |

(52) U.S. Cl.
CPC ............. *H04N 23/64* (2023.01); *G06T 7/246* (2017.01); *G06T 7/55* (2017.01); *G06T 7/73* (2017.01);
(Continued)

(58) Field of Classification Search
CPC ...... H04N 23/64; H04N 23/633; G06T 7/246; G06T 7/55; G06T 7/73;
(Continued)

(56) References Cited

U.S. PATENT DOCUMENTS 8,867,827 B2    10/2014  Yeatman, Jr. et al.
8,885,925 B2    11/2014  Cameron et al.
(Continued)

FOREIGN PATENT DOCUMENTS

| CN | 113111751 A | 7/2021 |
|---|---|---|
| CN | 113902927 A | 4/2022 |

(Continued)

OTHER PUBLICATIONS

International Search Report and Written Opinion issued by the International Searching Authority on Dec. 13, 2023 in International Application No. PCT/KR2023/013731 (PCT/ISA/220, PCT/ISA/210, and PCT/ISA/237).

(Continued)

*Primary Examiner* — Yogesh K Aggarwal
(74) *Attorney, Agent, or Firm* — Sughrue Mion, PLLC

(57)            ABSTRACT

Provided are a method and an electronic device for generating a point cloud. The method includes obtaining, from at least one sensor of the electronic device, first sensing data corresponding to an object, obtaining a first point cloud corresponding to the object, based on the first sensing data, identifying, by using at least one artificial intelligence model, at least one outlier point indicating violation of at least one predefined rule in the first point cloud, and providing a re-photographing location guide for re-photographing the object, based on the at least one outlier point.

15 Claims, 24 Drawing Sheets

(52) U.S. Cl.
CPC . *H04N 23/633* (2023.01); *G06T 2207/10016* (2013.01); *G06T 2207/10028* (2013.01); *G06T 2207/20081* (2013.01); *G06T 2207/20084* (2013.01); *G06T 2207/30244* (2013.01)

(58) Field of Classification Search
CPC . G06T 2207/10016; G06T 2207/10028; G06T 2207/20081; G06T 2207/20084; G06T 2207/30244
See application file for complete search history.

(56) References Cited

U.S. PATENT DOCUMENTS

| | | | |
|---|---|---|---|
| 10,650,588 B2 | 5/2020 | Hazeghi et al. | |
| 11,004,261 B2 | 5/2021 | Yao et al. | |
| 11,302,095 B2 * | 4/2022 | Challa | G06N 20/00 |
| 11,493,599 B2 | 11/2022 | Bockem et al. | |
| 2015/0235484 A1 * | 8/2015 | Kraeling | G07C 5/0866 |
| | | | 701/1 |
| 2015/0279044 A1 * | 10/2015 | Kim | G06T 17/20 |
| | | | 345/419 |
| 2019/0208117 A1 * | 7/2019 | Jung | H04N 23/635 |
| 2021/0082135 A1 | 3/2021 | Xu et al. | |
| 2022/0111853 A1 | 4/2022 | Zhou et al. | |

FOREIGN PATENT DOCUMENTS

| | | | |
|---|---|---|---|
| EP | 4 130 690 A1 | 2/2023 | |
| JP | 2020-135765 A | 8/2020 | |
| JP | 2022-515162 A | 2/2022 | |
| KR | 10-2015-0113751 A | 10/2015 | |
| KR | 10-2158323 B1 | 9/2020 | |
| KR | 10-2021-0027269 A | 3/2021 | |
| KR | 10-2022-0074674 A | 6/2022 | |
| WO | 2017/026839 A1 | 2/2017 | |
| WO | 2021/193816 A1 | 9/2021 | |

OTHER PUBLICATIONS

"Recommended apps for iphone 12 Pro. How to steal a house using the iPhone 12 Pro LiDAR scanner." YouTube, (3:15-3:24), Nov. 24, 2020 https://youtu.be/ttxpcrDzaHA?t=137.

Luis S. Piloto et al., "Intuitive physics learning in a deep-learning model inspired by developmental psychology," Nature Human Behaviour, vol. 6, Sep. 2022, pp. 1257-1267.

"iPhone 12 Pro LIDAR Sensor—Incredible Fast 3D Scanner!," YouTube, (2:09-3:05), Dec. 7, 2020, https://youtu.be/r26OhSxBUXM?t=166.

Dejan Azinovic et al., "Neural RGB-D Surface Reconstruction," Technical University of Munich, Google Research, Max Planck Institute for Intelligent Systems, 2022 (Total 21 pages).

"From depth map to point cloud," Medium, Sep. 24, 2020, https://medium.com/yodayoda/from-depth-map-to-point-cloud-7473721d3f.

"What is LiDAR? (& Why is It on Apple Devices All of a Sudden)," YouTube, (4:28-4:30), May 17, 2023, https://www.youtube.com/watch?v=FOxxqVzDaaA.

Communication issued on Jul. 9, 2025 by the European Patent Office in European Patent Application No. 23875095.4.

* cited by examiner

FIG. 6B $C_{camera} = \{C_1, C_2, \ldots, C_M\}, C_m = \{x_m, y_m, z_m, f\}$ $$P_{HeatMap} = \{P_1, P_2, \ldots, P_N\}, \; P_n = \{x_n, y_n\}$$

METHOD AND ELECTRONIC DEVICE FOR GENERATING POINT CLOUD

CROSS-REFERENCE TO RELATED APPLICATIONS

This application is a by-pass continuation application of International Application No. PCT/KR2023/013731, filed on Sep. 13, 2023, which is based on and claims priority to Korean Patent Application Nos. 10-2022-0129053, filed on Oct. 7, 2022, and 10-2023-0026906, filed on Feb. 28, 2023, in the Korean Intellectual Property Office, the disclosures of which are incorporated by reference herein their entireties.

BACKGROUND

1. Field

The disclosure relates to a method and an electronic device for generating a point cloud.

2. Description of Related Art

In the past, image sensors of user devices, such as smartphones, captured images with low resolutions due to their small sizes. Also, blur phenomena frequently occurred. Optical image stabilization technologies and technologies for measuring depth information were not developed.

Recently, the user devices are equipped with various sensors, such as light detection and ranging (LiDAR) sensors, Time-of-Flight (ToF) sensors, and Red/Green/Blue depth (RGB-D) sensors. Thus, methods of generating point clouds of objects from images captured by using these sensors have been studied. As the various sensors are installed in the user devices, applications of point cloud generation technologies are expanding. For example, point clouds are widely used in application like three-dimensional (3D) scanning, 3D printing, virtual reality, augmented reality, and autonomous driving.

SUMMARY

According to an embodiment of the disclosure, a method performed by an electronic device for generating a point cloud, includes: obtaining, from at least one sensor of the electronic device, first sensing data corresponding to an object; obtaining a first point cloud corresponding to the object, based on the first sensing data; identifying, by using at least one artificial intelligence model, at least one outlier point indicating violation of at least one predefined rule in the first point cloud; and providing a re-photographing location guide for re-photographing the object, based on the at least one outlier point.

According to an embodiment of the disclosure, an electronic device for generating a point cloud, includes: at least one sensor; a memory storing one or more instructions; and at least one processor configured to execute the one or more instructions stored in the memory, wherein the at least one processor is configured to execute the one or more instructions to: obtain, from the at least one sensor, first sensing data corresponding to an object; obtain a first point cloud corresponding to the object, based on the first sensing data; identify, by using at least one artificial intelligence model, at least one outlier point indicating violation of at least one predefined rule in the first point cloud; and provide a re-photographing location guide for re-photographing the object, based on the at least one outlier point.

According to an embodiment of the disclosure, a computer-readable recording medium has recorded thereon a computer program, which, when executed by a computer, performs the method.

BRIEF DESCRIPTION OF DRAWINGS

The above and other aspects, features, and advantages of certain embodiments of the disclosure will be more apparent from the following description taken in conjunction with the accompanying drawings, in which:

FIG. 6B illustrates a method of generating multi-view images and obtaining camera information, according to an embodiment of the disclosure;

DETAILED DESCRIPTION

Figure 1:
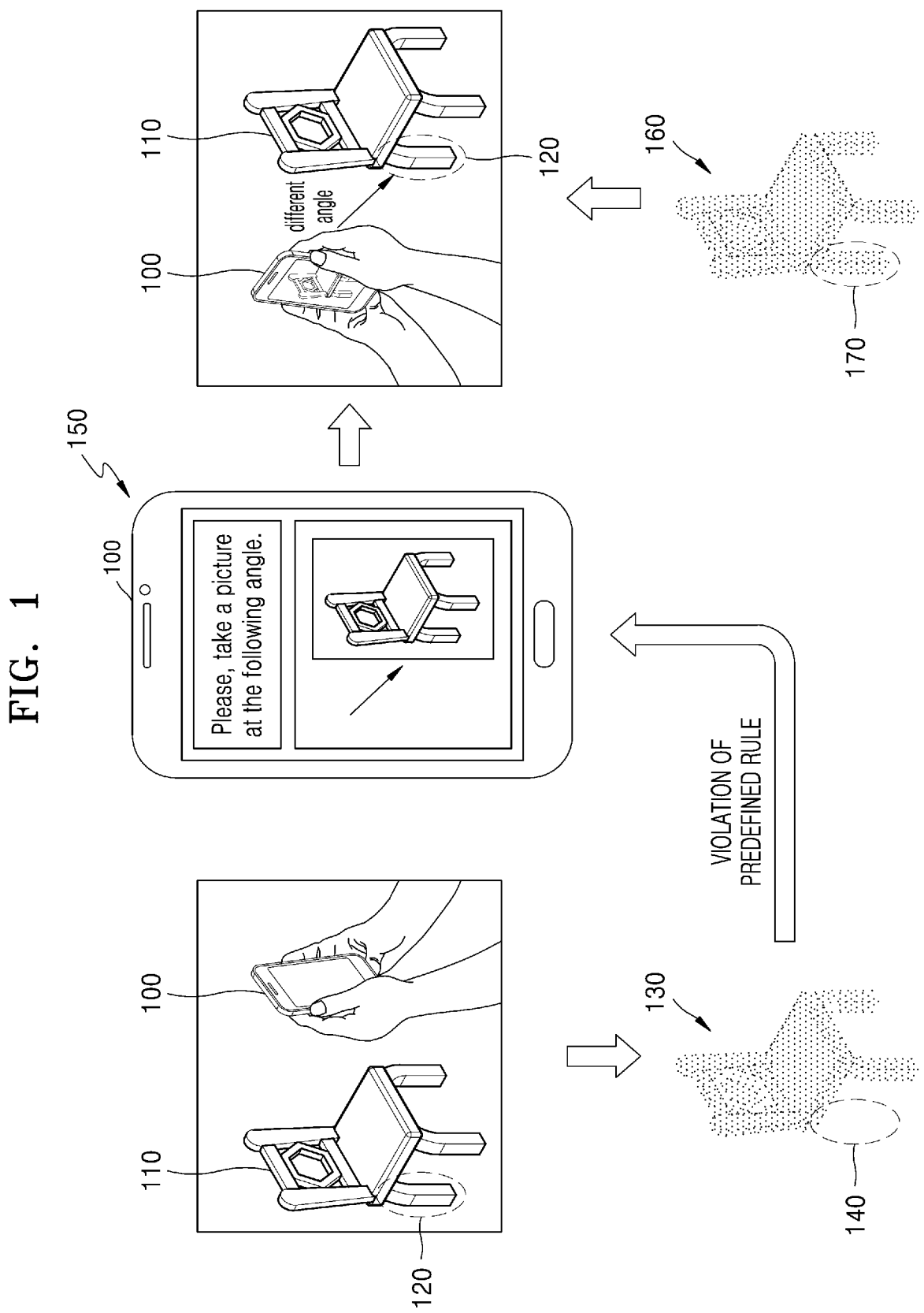
FIG. 1 illustrates a method of generating a point cloud, according to an embodiment of the disclosure.

Throughout the disclosure, the expression "at least one of a, b or c" indicates only a, only b, only c, both a and b, both a and c, both b and c, or all of a, b, and c.

Although general terms widely used at present were selected for describing the disclosure in consideration of the functions thereof, these general terms may vary according to intentions of one of ordinary skill in the art, case precedents, the advent of new technologies, and the like. Terms arbitrarily selected by the applicant of the disclosure may also be used in a specific case. In this case, their meanings need to be given in the detailed description of the disclosure. Hence, the terms used in the disclosure must be defined based on their meanings and the contents of the entire specification, not by simply stating the terms.

An expression used in the singular may encompass the expression of the plural, unless it has a clearly different meaning in the context. Unless otherwise defined, all terms (including technical and scientific terms) used herein have the same meaning as commonly understood by one of ordinary skill in the art to which this disclosure belongs. While such terms as "first", "second", etc., used in the present specification may be used to describe various components, such components must not be limited to the above terms. The above terms are used only to distinguish one component from another.

The terms "comprises" and/or "comprising" or "includes" and/or "including" when used in this specification, specify the presence of stated elements, but do not preclude the presence or addition of one or more other elements. The terms "unit", "-er (-or)", and "module" when used in this specification refers to a unit in which at least one function or operation is performed, and may be implemented as hardware, software, or a combination of hardware and software.

Embodiments of the disclosure are described in detail herein with reference to the accompanying drawings so that this disclosure may be easily performed by one of ordinary skill in the art to which the disclosure pertains. The disclosure may, however, be embodied in many different forms and should not be construed as being limited to the embodiments set forth herein. In the drawings, parts irrelevant to the description are omitted for simplicity of explanation, and like numbers refer to like elements throughout the specification. In addition, reference numerals used in each drawing are only for describing each drawing, and different reference numerals used in different drawings do not indicate different elements. Embodiments of the disclosure will now be described more fully with reference to the accompanying drawings.

FIG. 1 illustrates a method of generating a point cloud according to an embodiment of the disclosure.

Referring to FIG. 1, an electronic device 100 according to an embodiment may be a device including a sensor (e.g., an image sensor) and a display. The electronic device 100 may be a device that obtains sensing data (e.g., still image data and moving picture data) through a sensor and outputs the sensing data through a display. For example, the electronic device 100 may include, but is not limited to, a smart TV, a smartphone, a tablet personal computer (PC), a laptop PC, and the like. The electronic device 100 may be implemented by using various sorts and types of electronic devices including a sensor and a display. The electronic device 100 may also include a speaker for outputting audio. A specific configuration, operation, and function of the electronic device 100 will be described in more detail with reference to FIGS. 2A and 2B.

According to an embodiment of the disclosure, a user of the electronic device 100 may photograph an object 110 by using the sensor of the electronic device 100. For convenience of explanation, the object 110 is shown in the form of a chair, but the type of object 110 is not limited thereto. The electronic device 100 may obtain sensing data including at least a portion of the object 110.

According to an embodiment of the disclosure, the electronic device 100 may obtain first sensing data corresponding to the object 110 from the sensor. The electronic device 100 may obtain a first point cloud 130 corresponding to the object 110, based on the first sensing data.

In the disclosure, a point cloud may represent a set of points corresponding to at least a portion of an object in a 3D coordinate system. The point cloud may be expressed as a point cloud image.

The first point cloud 130 may correspond to the entirety or a portion of the object 110. According to an embodiment of the disclosure, a missing portion 140 from which points corresponding to a partial area 120 of the object 110 are omitted may exist in the first point cloud 130. The corresponding points may also be referred to as missing points. For example, the first point cloud 130 corresponding to the entirety of the object 110 may not be generated (or obtained) according to the position and/or angle of a sensor that senses (or photographs) the object 110. For example, the missing portion 140 of the first point cloud 130 may be generated by at least one of specular reflection, signal absorption, occlusion by another object, self-occlusion of an object, or a blind spot. However, the disclosure is not limited thereto.

The electronic device 100 may identify at least one outlier point from the first point cloud 130 by using an artificial network model (a deep neural network model). According to an embodiment of the disclosure, the at least one outlier point may represent a violation of at least one predefined rule. According to an embodiment of the disclosure, the electronic device 100 may identify at least one outlier point representing a violation of one predefined rule from the first point cloud 130 by using an artificial network model (a deep neural network model). According to an embodiment of the disclosure, the electronic device 100 may identify at least one outlier point representing a violation of each of a plurality of predefined rules from the first point cloud 130 by using an artificial network model (a deep neural network model). According to an embodiment of the disclosure, the electronic device 100 may identify at least one outlier point representing a violation of a predefined rule corresponding to each of a plurality of artificial network models (deep neural network models) deep neural network models from the first point cloud 130 by using the plurality of artificial network models (deep neural network models).

In the disclosure, as an example of artificial intelligence models, a deep neural network model may be composed of a plurality of neural network layers. The disclosure is not limited to the deep neural network model, and is applied to other types of artificial intelligence models.

Each of the plurality of neural network layers has a plurality of weight values, and performs a neural network operation through an operation between an operation result of a previous layer and the plurality of weight values. The plurality of weight values of the plurality of neural network layers may be optimized by a learning result of the deep neural network model. For example, the plurality of weight values may be updated so that a loss value or a cost value obtained from the deep neural network model is reduced or minimized during a learning process. Examples of the deep neural network model may include a Convolutional Neural Network (CNN), a Deep Neural Network (DNN), a Recurrent Neural Network (RNN), a Restricted Boltzmann Machine (RBM), a Deep Belief Network (DBN), a Bidirectional Recurrent Deep Neural Network (BRDNN), or Deep Q-Networks. However, the disclosure is not limited to the above-described examples.

In the disclosure, the predefined rule may include law of physics. The law of physics may represent intuitive physics that may be intuitively understood from the point of view of human common sense. For example, when the movement of an object expressed in a still image or moving picture is not understood from the point of view of human common sense, the movement of the object violates the law of physics. For example, the law of physics may include, but are not limited to, object persistence, solidity, unchangeableness, and/or directional inertia.

According to an embodiment of the disclosure, due to the existence of the missing portion 140 corresponding to the missing points of the first point cloud 130, the first point cloud 130 may be identified as having violated at least one predefined rule. For example, when a chair object has only two legs in front, the chair should lean backwards, but the chair standing upright may be identified as not obeying the predefined rule (e.g., gravity).

The electronic device 100 may provide a re-photographing location guide 150 for the object 110, based on the at least one outlier point. For example, the electronic device 100 may output (or display) the re-photographing location guide 150 through the display. For example, the re-photographing location guide 150 may include a message, an image, and/or audio instructing to sense (or photograph) the object 110 at a different position or angle. For example, the re-photographing location guide 150 may be provided through a specific application (e.g., a 3D modeling application) installed in the electronic device 100.

A user of the electronic device 100 may photograph at least a portion of the object 110 at an angle different from a photographing angle corresponding to the first sensing data with reference to the re-photographing location guide 150.

According to an embodiment of the disclosure, the electronic device 100 may obtain second sensing data corresponding to at least a portion of the object 110 from the sensor. The electronic device 100 may obtain a second point cloud 160, based on the first sensing data and the second sensing data. The second point cloud may be a complete point cloud including a set 170 of missing points corresponding to the missing portion 140 in the first point cloud 130.

Figure 2A:
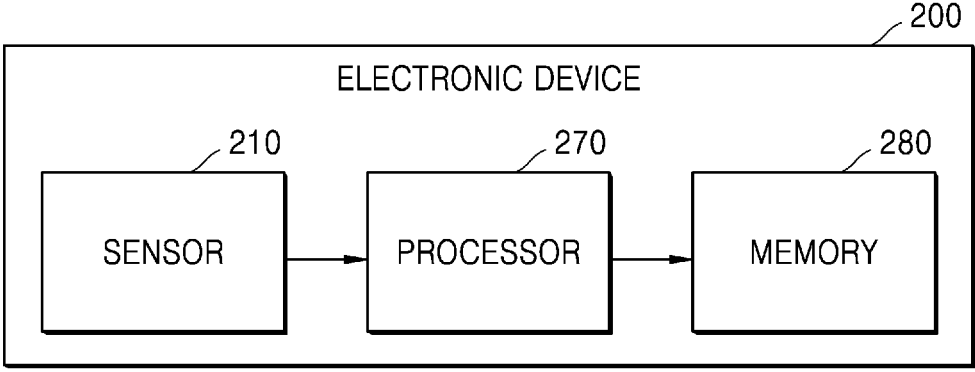
FIGS. 2A and 2B illustrate an electronic device implementing a method of generating a point cloud, according to an embodiment of the disclosure.
Figure 2B:
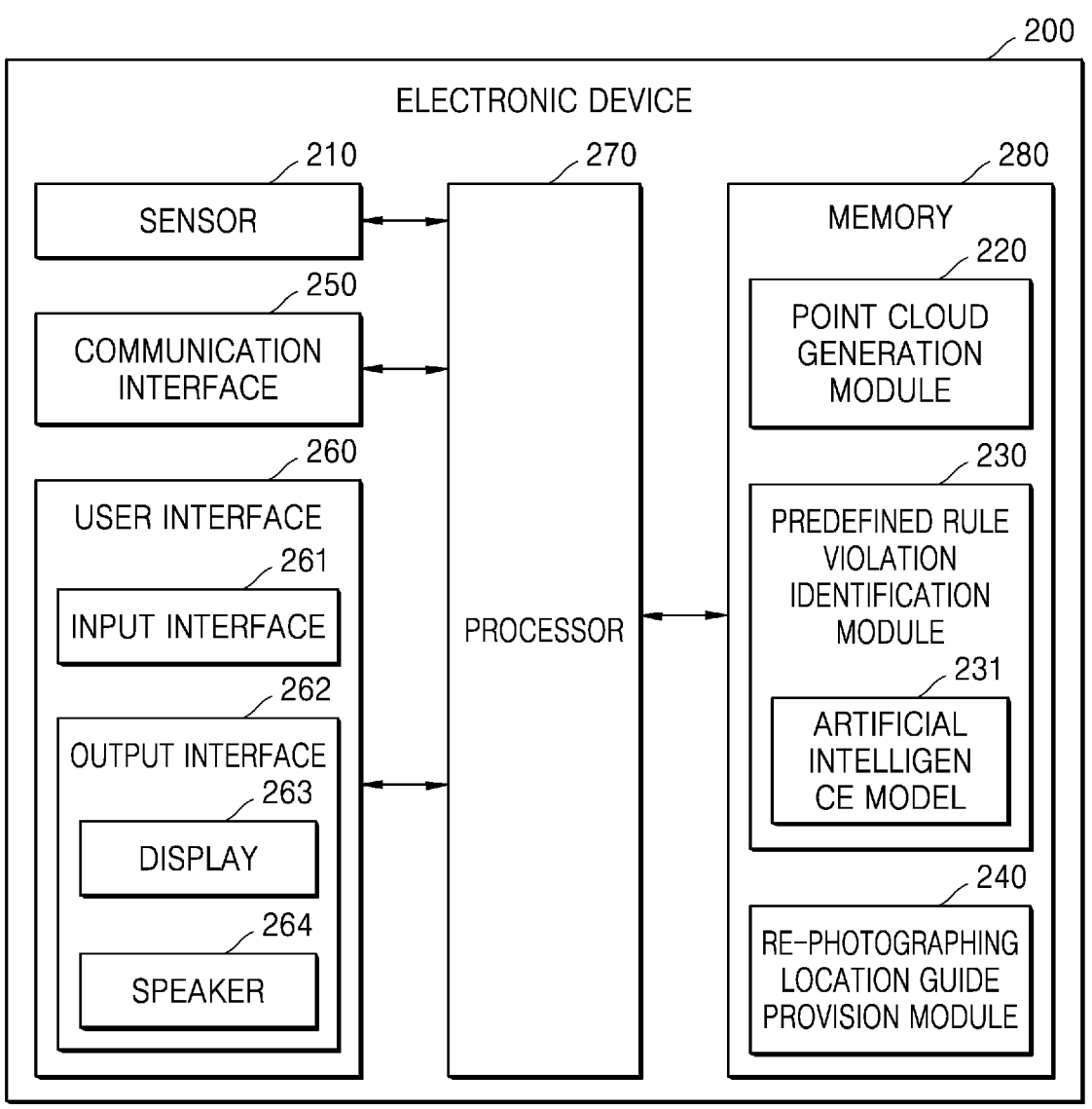

FIGS. 2A and 2B are block diagrams of an electronic device 200 implementing a method of generating a point cloud, according to an embodiment of the disclosure. A configuration, an operation, and a function of the electronic device 200 may correspond to a configuration, an operation, and a function of the electronic device 100 of FIG. 1. For convenience of explanation, matters of FIGS. 2A and 2B that are the same as those described above with reference to FIG. 1 will not be repeated herein.

Referring to FIG. 2A, the electronic device 200 according to an embodiment of the disclosure may include a sensor 210, a memory 280, and a processor 270. However, the components shown in FIG. 2A are not essential components, and the electronic device 200 may omit components or may further include additional components. For example, as shown in FIG. 2B, the electronic device 200 according to an embodiment of the disclosure may include at least one sensor 210, a communication interface 250, a user interface 260, a processor 270, and a memory 280.

The sensor 210 may convert measured or sensed information into an electrical signal (or sensing data) by measuring or sensing a physical quantity or a physical feature. For example, the sensor 210 may include at least one camera or image sensor for capturing at least one frame of a still image or moving picture of an external scene. For example, the sensor 210 may include at least one of at least one button for touch input, a gesture sensor, a gyroscope, a gyro sensor, an air pressure sensor, a magnetic sensor, a magnetometer, an acceleration sensor, an accelerometer, a grip sensor, a proximity sensor, an RGB sensor, a biophysical sensor, a temperature sensor, a humidity sensor, an illuminance sensor, an ultraviolet sensor, an electromyogram sensor, an electroencephalogram sensor, an electrocardiogram sensor, an infrared sensor, an ultrasonic sensor, an iris sensor, or a fingerprint sensor. However, the disclosure is not limited thereto.

According to an embodiment of the disclosure, the sensor 210 may photograph a scene including an object. The sensor 210 may generate sensing data for generating a point cloud corresponding to the object. For example, the sensor 210 may include at least one of an image sensor, a LiDAR sensor, an RGB-D sensor, a depth sensor, a time of flight (ToF) sensor, an ultrasonic sensor, a radar sensor, or a stereo camera. However, the disclosure is not limited thereto. The sensor 210 may transmit the sensing data to a point cloud generation module 220. According to an embodiment of the disclosure, the sensing data may be at least one still image or moving picture.

The communication interface 250 may support establishment of a wired or wireless communication channel between the electronic device 200 and another external electronic device (not shown) or a server (not shown) and communication through the established communication channel. According to an embodiment of the disclosure, the communication interface 250 may receive data from the other external electronic device or the server through wired or wireless communication, or may transmit data to the other external electronic device or the server. According to an embodiment of the disclosure, the communication interface 250 may include a wireless communication module (e.g., a cellular communication module, a short-distance wireless communication module, or a global navigation satellite system (GNSS) communication module) or a wired communication module (e.g., a local area network (LAN) communication module or a power line communication module), and may communicate with the other external electronic device or the server through at least one network, for example, a short-range communication network (e.g., Bluetooth, WiFi direct, or infrared data association (IrDA)) or a long-distance communication module (e.g., a cellular network, the Internet, or a computer network (e.g., a LAN or WAN)), by using any one of the aforementioned communication modules.

The user interface 260 may include an input interface 261 and an output interface 262.

The input interface 261 is for receiving an input from a user (hereinafter, a user input). The input interface 261 may include, but is not limited to, at least one of a key pad, a dome switch, a touch pad (e.g., a capacitive overlay type, a resistive overlay type, an infrared beam type, an integral strain gauge type, a surface acoustic wave type, a piezoelectric type, or the like), a jog wheel, or a jog switch.

The input interface 261 may include a voice recognition module. For example, the electronic device 200 may receive a speech signal, which is an analog signal, through a microphone, and convert the speech signal into computer-readable text by using an automatic speech recognition (ASR) model. The electronic device 200 may also obtain a user's utterance intention by interpreting the converted text using a Natural Language Understanding (NLU) model. The ASR model or the NLU model may be an AI model. The AI model may be processed by an AI-only processor designed with a hardware structure specialized for processing the AI model. The AI model may be generated through learning. Here, being generated through learning means that a basic AI model is trained using a plurality of training data by a learning algorithm, so that a predefined operation rule or AI model set to perform desired characteristics (or a desired purpose) is generated. The AI model may be composed of a plurality of neural network layers. Each of the plurality of neural network layers has a plurality of weight values, and performs a neural network operation through an operation between an operation result of a previous layer and the plurality of weight values.

Linguistic understanding is a technology that recognizes and applies/processes human language/character, and thus includes natural language processing, machine translation, a dialog system, question answering, and speech recognition/speech recognition/synthesis, etc.

The output interface 262 is provided to output an audio signal or a video signal, and may include a display 263, a speaker 264, or the like.

According to an embodiment of the disclosure, the electronic device 200 may display information related with the electronic device 200 via the display 263. For example, the electronic device 200 may display, on the display 263, images obtained by visualizing the sensing data of the sensor 210. For example, the electronic device 200 may display a re-photographing location guide on the display 263.

When the display 263 forms a layer structure together with a touch pad to construct a touch screen, the display 263 may be used as an input device as well as an output device. The display 263 may include at least one selected from a liquid crystal display (LCD), a thin film transistor-liquid crystal display (TFT-LCD), a light-emitting diode (LED), an organic light-emitting diode (OLED), a flexible display, a 3D display, and an electrophoretic display. According to embodiments of the electronic device 200, the electronic device 200 may include at least two displays.

The speaker 264 may output audio data that is received from the communication interface 250 or stored in the memory 280. The speaker 264 may output audio signals related to functions performed by the electronic device 200.

The processor 270 may be implemented through a combination of a general-purpose processor, such as an application processor (AP), a central processing unit (CPU), or a graphics processing unit (GPU), and software. The dedicated processor may include a memory for implementing an embodiment of the disclosure or a memory processing unit for using an external memory.

The processor 270 may include a plurality of processors. In this case, the processor 270 may be implemented as a combination of dedicated processors, or may be implemented through a combination of software and a plurality of general-purpose processors such as an AP, a CPU, or a GPU.

According to an embodiment of the disclosure, the processor 270 may include an artificial intelligence (AI) processor. The AI processor may be manufactured in the form of an exclusive hardware chip for AI, or may be manufactured as a part of an existing general-purpose processor (for example, a CPU or an AP) or a graphic-exclusive processor (for example, a GPU) and may be mounted on the electronic device 200. For example, the AI processor may perform data processing necessary for learning and/or inference related to at least one artificial intelligence model 231.

Functions related to AI according to the disclosure are operated through a processor and a memory. The processor may include one or a plurality of processors. The one or plurality of processors may be a general-purpose processor such as a central processing unit (CPU), an application processor (AP), or a digital signal processor (DSP), a graphics-only processor such as a graphics processing unit (GPU) or a vision processing unit (VPU), or an AI-only processor such as a neural processing unit (NPU). The one or plurality of processors control to process input data, according to a predefined operation rule or AI model (e.g., a deep neural network model) stored in the memory. Alternatively, when the one or plurality of processors are AI processors, which may be designed in a hardware structure specialized for processing a specific AI model.

The predefined operation rule or AI model is characterized in that it is generated through learning. Here, being generated through learning means that a basic AI model is trained using a plurality of training data by a learning algorithm, so that a predefined operation rule or AI model set to perform desired characteristics (or a desired purpose) is generated. Such learning may be performed in a device itself on which AI according to the disclosure is performed, or may be performed through a separate server and/or system. Examples of the learning algorithm include, but are not limited to, supervised learning, unsupervised learning, semi-supervised learning, or reinforcement learning. The memory 280 may store a program for processing and control by the processor 270, or may store input/output data. The memory 280 may store at least one artificial intelligence model 231.

The memory 280 may include at least one type of storage medium selected from among a flash memory type, a hard disk type, a multimedia card micro type, a card type memory (for example, a secure digital (SD) or extreme digital (XD) memory), a random access memory (RAM), a static random access memory (SRAM), a read-only memory (ROM), an electrically erasable programmable ROM (EEPROM), a programmable ROM (PROM), magnetic memory, a magnetic disk, and an optical disk. The electronic device 200 may operate a web storage or cloud server which performs a storage function on the Internet.

According to an embodiment of the disclosure, the memory 280 may store, for example, data, firmware, software, and process codes that are processed or scheduled to be processed by the processor 270. According to an embodiment of the disclosure, the memory 280 may store data and program codes corresponding to at least one of the point cloud generation module 220, a predefined rule violation identification module 230, the at least one artificial intelligence model 231, or a re-photographing location guide provision module 240.

The point cloud generation module 220 may receive sensing data. The point cloud generation module 220 may generate (or obtain) a point cloud, based on the sensing data. The point cloud generation module 220 may perform data processing for generating the point cloud. For example, the point cloud generation module 220 may remove and/or filter out noise from the sensing data. The point cloud generation module 220 may extract information such as a distance and/or an angle between an object of a scene and a sensor, based on the sensing data. The point cloud generation module 220 may convert the extracted information into data including the points of a 3D coordinate system. The point cloud generation module 220 may transmit the converted data, that is, the point cloud, to the predefined rule violation identification module 230.

According to an embodiment of the disclosure, the point cloud generation module 220 may perform object detection, based on the sensing data. The point cloud generation module 220 may generate a point cloud corresponding to the detected object.

According to an embodiment of the disclosure, the sensor 210 may include an image sensor (e.g., an RGB sensor). The sensor 210 may obtain sensing data (e.g., a color image) corresponding to the object. The point cloud generation module 220 may estimate the depth of a scene (or object) from 2D sensing data, in order to generate a point cloud, based on the sensing data. For example, the point cloud generation module 220 may estimate the depth of the scene by using a visual simultaneous localization and mapping (vSLAM) algorithm. The point cloud generation module 220 may generate the point cloud by using the sensing data and the estimated depth.

According to an embodiment of the disclosure the sensor 210 may include a stereo camera (e.g., two image sensors). For example, two image sensors may be disposed in the electronic device 200 at regular intervals. Each of the two image sensors may photograph the object at the same time. Each of the two image sensors may obtain a color image corresponding to the object. The point cloud generation module 220 may estimate the depth of the scene from the two color images. The point cloud generation module 220 may generate the point cloud by using the sensing data and the estimated depth.

According to an embodiment of the disclosure, the sensor 210 may include a sensor that measures a depth value of the scene or the object (e.g., a LiDAR sensor, an RGB-D sensor, a depth sensor, a ToF sensor, an ultrasonic sensor, or a radar sensor). The sensor 210 may obtain sensing data including the depth value. The point cloud generation module 220 may generate the point cloud, based on the sensing data.

According to an embodiment of the disclosure, the sensor 210 may be composed of a combination of two or more types of sensors. The point cloud generation module 220 may time-synchronize sensing data obtained by the two or more types of sensors with each other. According to an embodiment of the disclosure, the sensor 210 may be composed of an image sensor and a ToF sensor. The point cloud generation module 220 may generate the point cloud by using a color image obtained by the image sensor and a depth value obtained by the ToF sensor. According to an embodiment of the disclosure, the sensor 210 may be composed of an RGB-D sensor and a LiDAR sensor. The point cloud generation module 220 may generate the point cloud, based on sensing data obtained by each of the RGB-D sensor and the LiDAR sensor. According to an embodiment of the disclosure, a point cloud with high accuracy may be generated by using more types of sensors.

According to an embodiment of the disclosure, when the sensing data is a plurality of still images or a moving picture, the point cloud generation module 220 may match point clouds corresponding to various positions and angles by using a plurality of still images or a plurality of frames of a moving picture.

The predefined rule violation identification module 230 may include at least one artificial intelligence model 231. The predefined rule violation identification module 230 may receive the point cloud. The predefined rule violation identification module 230 may identify at least one outlier point from the point cloud by using the at least one artificial intelligence model 231.

According to an embodiment of the disclosure, the predefined rule violation identification module 230 may generate multi-view images corresponding to the object, based on the point cloud. In the disclosure, the multi-view images may refer to images of the same object at various viewpoints.

According to an embodiment of the disclosure, the predefined rule violation identification module 230 may perform 3D modeling with respect to the object, based on the point cloud. For example, the predefined rule violation identification module 230 may generate a mesh corresponding to the object, based on the point cloud. The predefined rule violation identification module 230 may perform texturing and UV mapping on the generated mesh.

According to an embodiment of the disclosure, the predefined rule violation identification module 230 may render a 3D model (e.g., a mesh) based on the point cloud. For example, rendering may be performed by generating 2D images by rotating the object 360 degrees. The predefined rule violation identification module 230 may generate multi-view images, based on a result of the rendering. The predefined rule violation identification module 230 may reconstruct the multi-view images into a moving picture of the object obtained by rotating a camera at various angles.

According to an embodiment of the disclosure, the predefined rule violation identification module 230 may obtain camera information corresponding to each of the multi-view images. For example, the camera information may include a camera matrix. For example, the camera matrix may include internal parameters (e.g., an optical center, lens distortion, and a focal length) of the camera and external parameters (e.g., a position and an orientation of the camera) of the camera.

The predefined rule violation identification module 230 may infer whether a movement of the object in the moving picture composed of the multi-view images violates at least one predefined rule, by applying the moving picture to the at least one artificial intelligence model 231. The movement of the object may correspond to a change in the object in a previous frame and a current frame. According to an embodiment of the disclosure, the at least one artificial intelligence model 231 may include a plurality of artificial intelligence models respectively corresponding to a plurality of predefined rules. The predefined rule violation identification module 230 may infer whether the movement of the object in the moving picture violates each of the plurality of predefined rules, by inputting the moving picture to each of the plurality of artificial intelligence models.

According to an embodiment of the disclosure, the at least one artificial intelligence model 231 may be trained to infer whether a movement of an object in an image sequence violates at least one predefined rule, by using, as training data, a data set including an image sequence that violates at least one predefined rule and an image sequence that does not violate the at least one predefined rule. For example, the at least one artificial intelligence model 231 may be trained to output data indicating that a predefined rule is violated, when the at least one predefined rule is violated, and output data indicating that a predefined rule is not violated, when the at least one predefined rule is not violated. According to an embodiment of the disclosure, in the data set, whether the image sequence that violates at least one predefined rule and the image sequence that does not violate the at least one predefined rule violate a predefined rule may be labeled. The at least one artificial intelligence model 231 may update weight values of the neural network layers of the at least one artificial intelligence model 231 by learning the data set.

According to an embodiment of the disclosure, the electronic device 200 or an external electronic device may train one artificial intelligence model to infer whether the movement of the object in the image sequence violates one predefined rule (e.g., object persistence), by using, as the training data, a data set corresponding to the one predefined rule (e.g., object persistence), in order to infer whether the one predefined rule is violated.

According to an embodiment of the disclosure, one artificial intelligence model may infer whether one predefined rule is violated. For example, a first artificial intelligence model may infer whether a first predefined rule is violated, a second artificial intelligence model may infer whether a second predefined rule is violated, and a k-th artificial intelligence model may infer whether a k-th predefined rule is violated. In this case, a artificial intelligence model to be trained by a training device (e.g., the electronic device 200 or an external electronic device) may be selected based on a user input or a manufacturer's setting. The data set may be secured by generating, through simulation, an image sequence that violates a predefined rule corresponding to the selected artificial intelligence model and an image sequence that does not violate the predefined rule.

The predefined rule violation identification module 230 may obtain a heat map corresponding to a result of the inference in the moving picture. The predefined rule violation identification module 230 may estimate points missing from the point cloud among the shape of the object, based on the heat map and the camera information. In the disclosure, the heat map may represent a set of points corresponding to a portion that violates a predefined rule in each of the frames of the moving picture.

The re-photographing location guide provision module 240 may provide a location guide for re-photographing the object, based on a portion (i.e., at least one outlier point) of the point cloud that violates at least one pre-defined predefined rule. The re-photographing location guide provision module 240 may transmit information about at least a portion of the object requiring re-photographing to a user by using the electronic device 200 or an external electronic device. For example, the re-photographing location guide provision module 240 may transmit the re-photographing location guide to the user through a message, an image, and/or audio.

Figure 3:
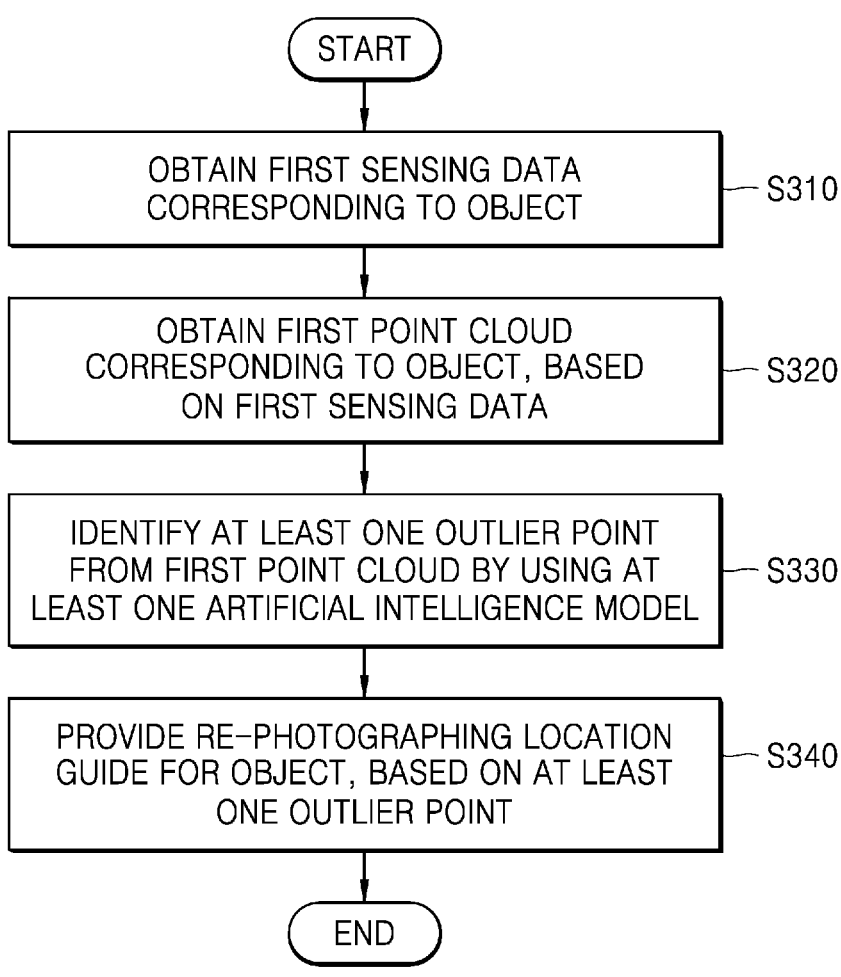
FIG. 3 illustrates a method of generating a point cloud, according to an embodiment of the disclosure.

FIG. 3 is a flowchart of a method of generating a point cloud, according to an embodiment of the disclosure. Matters of FIG. 3 that are the same as those described above with reference to FIGS. 1 through 2B will not be repeated herein. For convenience of description, FIG. 3 will be described with reference to FIGS. 2A and 2B.

Referring to FIG. 3, a method, performed by the electronic device 200, of generating a point cloud may include operations S310 through S340. According to an embodiment of the disclosure, operations S310 through S340 may be performed by the electronic device 200 or the processor 270 of the electronic device 200. A method, performed by the electronic device 200, of generating a point cloud, according to the disclosure, is not limited to that shown in FIG. 3. In one embodiment, any of the operations shown in FIG. 3 may be omitted. In one embodiment, the method of FIG. 3 may further include other operations that are well-known to a person having ordinary skill in the art.

In operation S310, first sensing data corresponding to an object may be obtained from at least one sensor 210 of the electronic device 200. The at least one sensor 210 may sense (or photograph) a scene including the object, based on a user input or a manufacturer's setting. According to an embodiment of the disclosure, the first sensing data may include at least one still image or a moving picture including a plurality of frames. According to an embodiment of the disclosure, the first sensing data may include a two-dimensional (2D) coordinate value, a depth value, and/or a color value.

In operation S320, the electronic device 200 may obtain a first point cloud corresponding to the object, based on the first sensing data. For example, the electronic device 200 may generate the first point cloud, based on the first sensing data. For example, the electronic device 200 may transmit the first sensing data to an external electronic device through the communication interface 250, and may receive the first point cloud from the external electronic device.

In operation S330, the electronic device 200 may identify at least one outlier point from the first point cloud by using at least one artificial intelligence model. According to an embodiment of the disclosure, the at least one outlier point may represent a violation of at least one predefined rule.

In operation S340, the electronic device 200 may provide a location guide for re-photographing the object, based on the at least one outlier point. The electronic device 200 may provide the re-photographing location guide by displaying an image and/or text on the display 263 or outputting audio through the speaker 264.

Figure 4A:
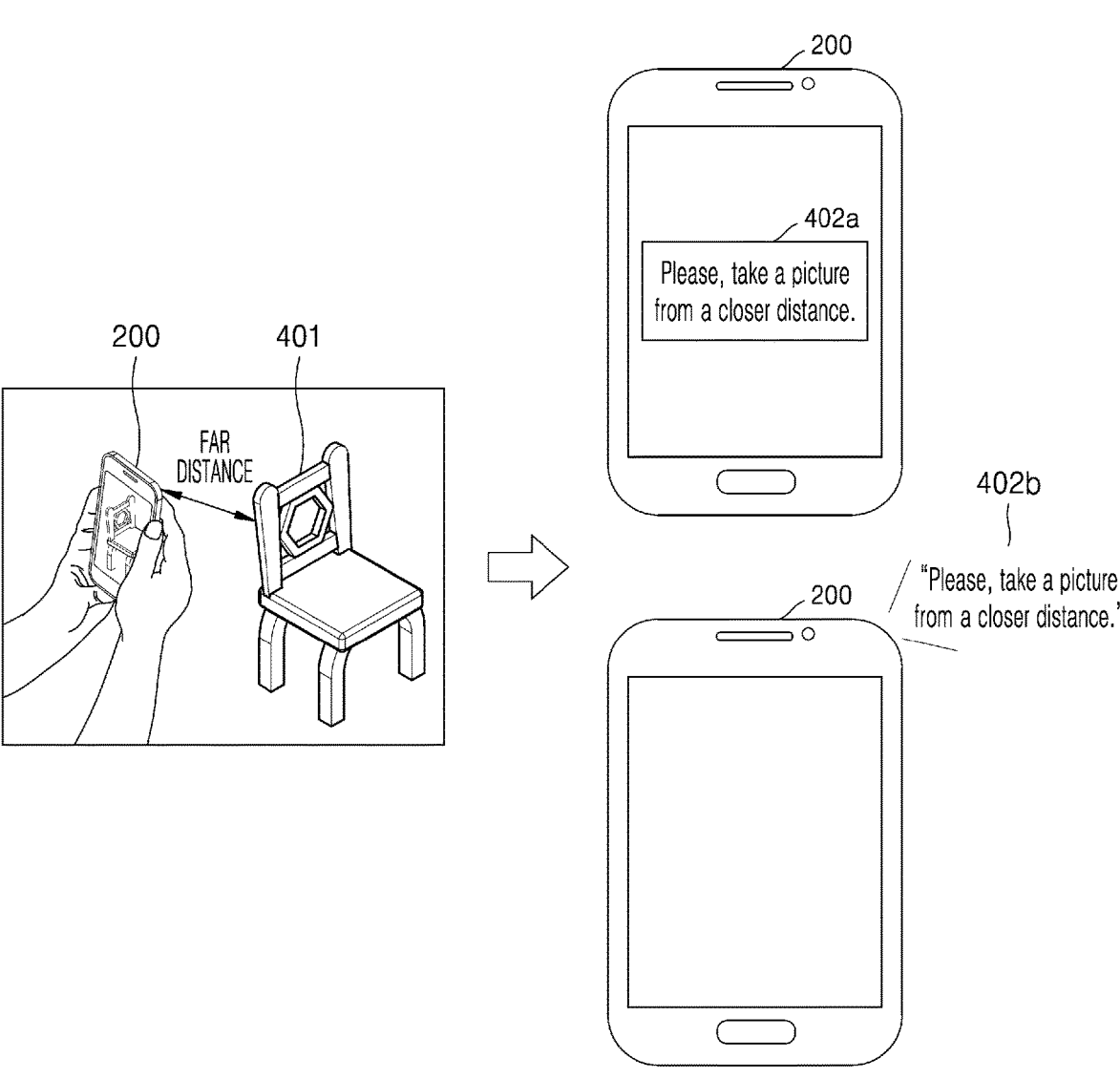
FIG. 4A illustrates a method of providing a re-photographing location guide, according to an embodiment of the disclosure.

FIG. 4A illustrates a method of providing a re-photographing location guide, according to an embodiment of the disclosure. Matters of FIG. 4A that are the same as those described above with reference to FIGS. 1 through 3 will not be repeated herein. For convenience of description, FIG. 4A will be described with reference to FIGS. 2A through 3.

Referring to FIG. 4A, due to a distance between the at least one sensor 210 of the electronic device 200 and an object 401, a pixel resolution corresponding to the object among the first sensing data representing the object 401 may be low. When the pixel resolution is low, a point cloud corresponding to at least a portion of an object may be omitted in a process of generating a point cloud corresponding to the object.

When the pixel resolution is less than a predefined threshold, the electronic device 200 may provide a re-photographing location guide instructing to photograph an object at a closer distance than the distance between the at least one sensor 210 and the object 401 in the first sensing data. For example, the electronic device 200 may display on the display 263 a text message 402a such as "Please take a picture from a closer distance.". For example, the electronic device 200 may output an audio 402b, such as "Please take a picture from a closer distance.", to the outside through speaker 264.

Figure 4B:
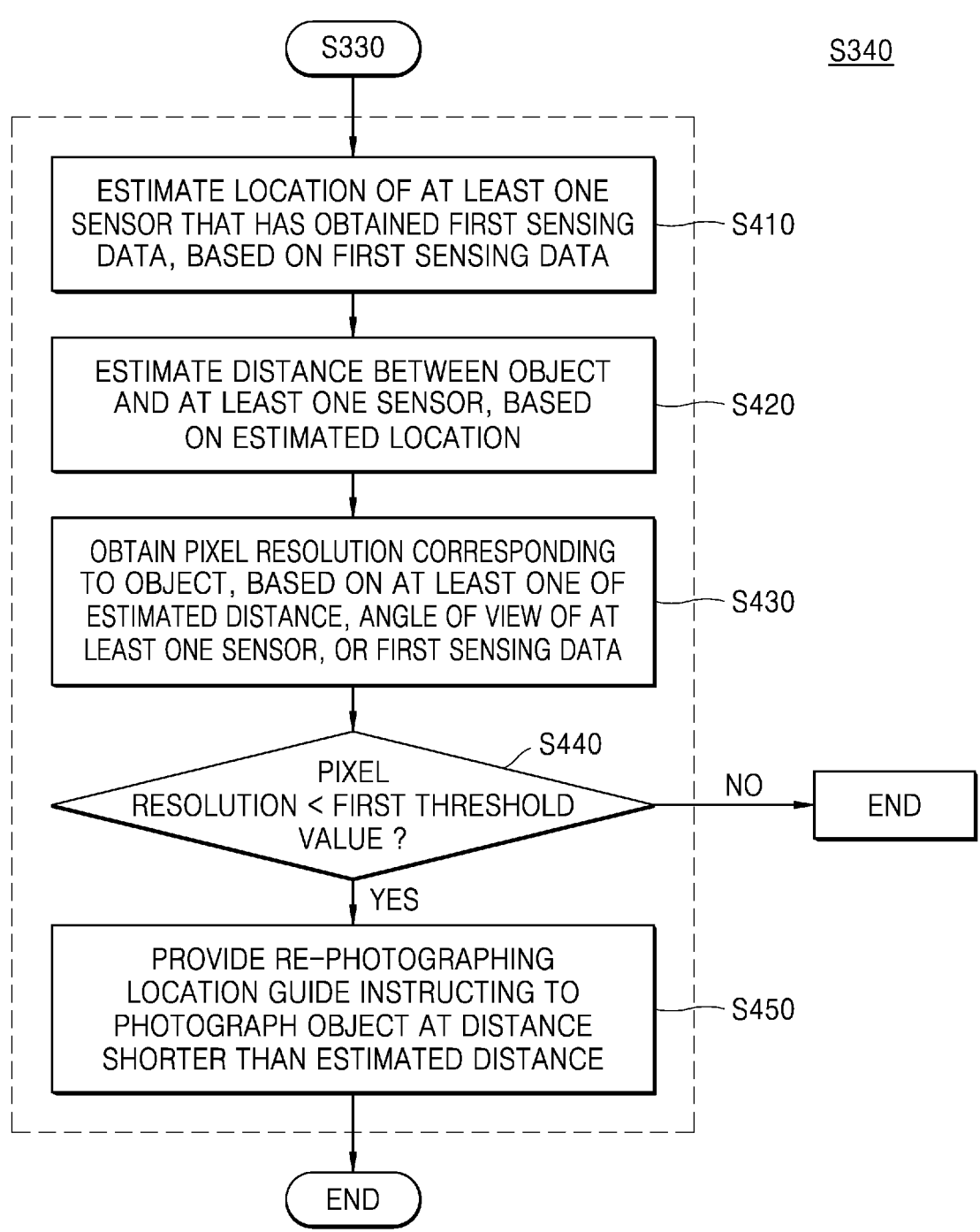
FIG. 4B illustrates a method of providing the re-photographing location guide of FIG. 4A.

FIG. 4B is a flowchart of a method of providing the re-photographing location guide of FIG. 4A. Matters of FIG. 4B that are the same as those described above with reference to FIGS. 1 through 4A will not be repeated herein. For convenience of description, FIG. 4B will be described with reference to FIGS. 2A through 4A.

Referring to FIG. 4B, operation S340 of FIG. 3 may include operations S410 through S450. According to an embodiment of the disclosure, operations S410 through S450 may be performed by the electronic device 200 or the processor 270 of the electronic device 200. Sub-operations of operation S340 according to the disclosure are not limited to those shown in FIG. 4B. In one embodiment, any of the operations shown in FIG. 4B may be omitted. In one embodiment, the sub-operations of FIG. 4B may further include operations that are well-known to a person having ordinary skill in the art.

In operation S410, the electronic device 200 may estimate the location of the at least one sensor 210 that has obtained the first sensing data, based on the first sensing data. For example, the electronic device 200 may determine the location of the at least one sensor 210, based on a single image or a plurality of images. The electronic device 200 may estimate feature points from the single image or the plurality of images. The electronic device 200 may estimate the location of the at least one sensor 210 by using the estimated feature points and/or specifications (e.g., a focal length) of the at least one sensor 210.

In operation S420, the electronic device 200 may estimate a distance between the object 401 and the at least one sensor 210, based on the estimated location. For example, the electronic device 200 may estimate the distance between the object 401 and the at least one sensor 210 by using at least one method among a pixel size, stereo vision, and ray casting. However, the disclosure is not limited to this method.

In operation S430, the electronic device 200 may obtain a pixel resolution corresponding to the object, based on at least one of the estimated distance, the angle of view of the at least one sensor 210, or the first sensing data. According to an embodiment of the disclosure, the electronic device 200 may obtain a pixel resolution corresponding to the object, based on at least one of the estimated distance, the angle of view of the at least one sensor 210, or resolution of the first sensing data. In the disclosure, the resolution may represent the total number of pixels included in sensing data (e.g., an image). In the disclosure, the pixel resolution may represent the number of pixels on the sensing data (e.g., an image) occupied by the object.

In operation S440, the electronic device 200 may determine whether the pixel resolution is less than a first threshold value. When the pixel resolution is equal to or greater than the first threshold value (No), the method is concluded. When the pixel resolution is less than the first threshold value (Yes), the method proceeds to operation S450.

In operation S450, the electronic device 200 may provide a re-photographing location guide instructing to photograph the object 401 at a distance shorter than the estimated distance.

Figure 5A:
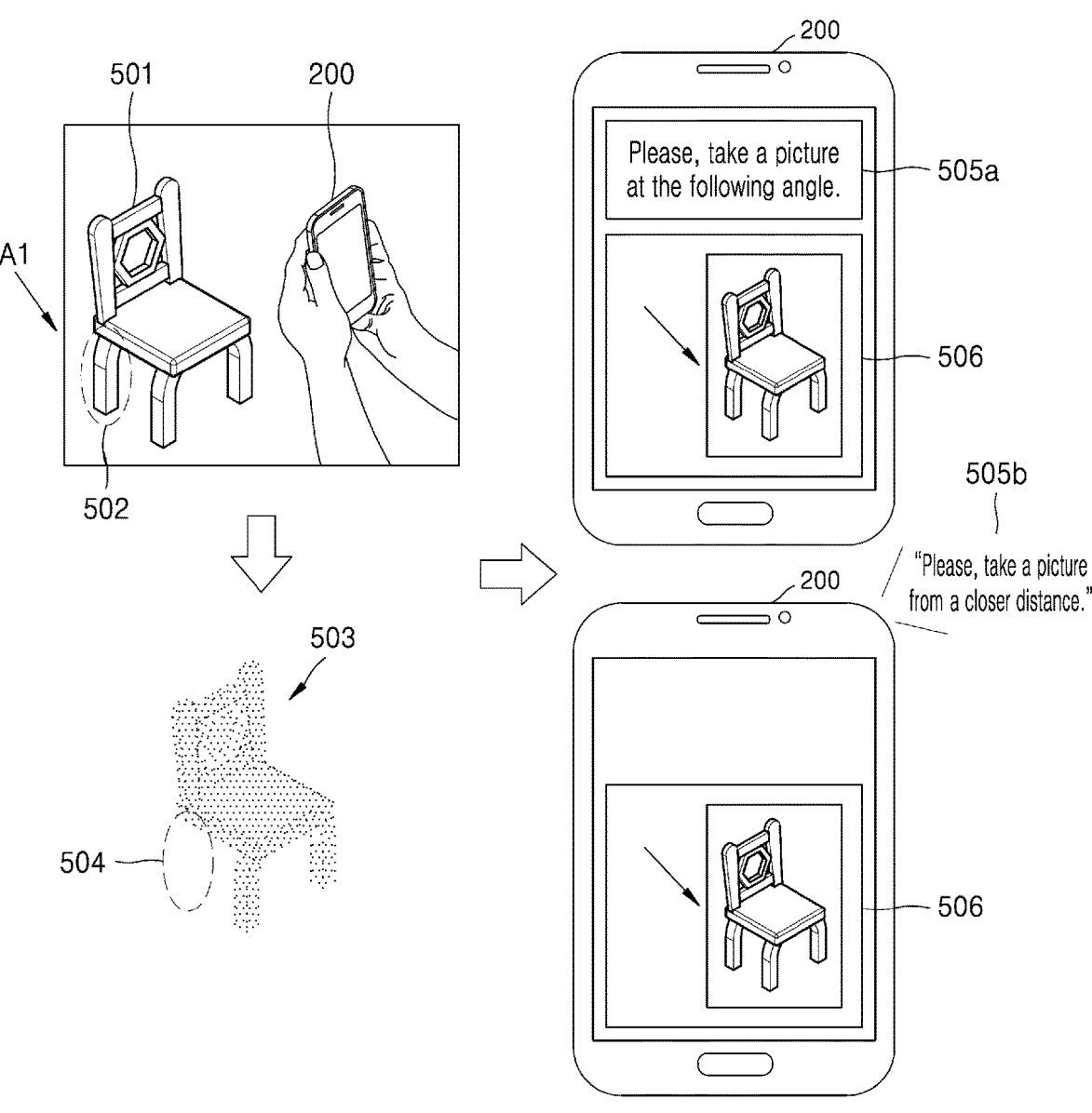
FIG. 5A illustrates a method of providing a re-photographing location guide, according to an embodiment of the disclosure.

FIG. 5A illustrates a method of providing a re-photographing location guide, according to an embodiment of the disclosure. Matters of FIG. 5A that are the same as those described above with reference to FIGS. 1 through 3 will not be repeated herein. For convenience of description, FIG. 5A will be described with reference to FIGS. 2A through 3.

Referring to FIG. 5A, for reasons such as occlusion corresponding to at least a portion of an object 501, a material forming the object 501, the structure of the object 501, and/or external noise (e.g., direct sunlight), a missing portion 504 of a point cloud 503 corresponding to a partial area 502 of the object 501 may exist. In order to fill in the missing portion 504 of the point cloud 503, sensing data obtained by photographing the partial area 502 of the object 501 at a specific position (or a direction, an angle, etc.) A1 may be needed.

The electronic device 200 may provide a re-photographing location guide instructing to photograph the object 501 at the specific position A1. For example, the electronic device 200 may display on the display 263 a text message 505*a* such as "Please take a picture at the following angle." For example, the electronic device 200 may output an audio 505*b*, such as "Please take a picture at the following angle.", to the outside through the speaker 264. For example, the electronic device 200 may display, on the display 263, an image obtained by visualizing a necessary photographing angle.

Figure 5B:
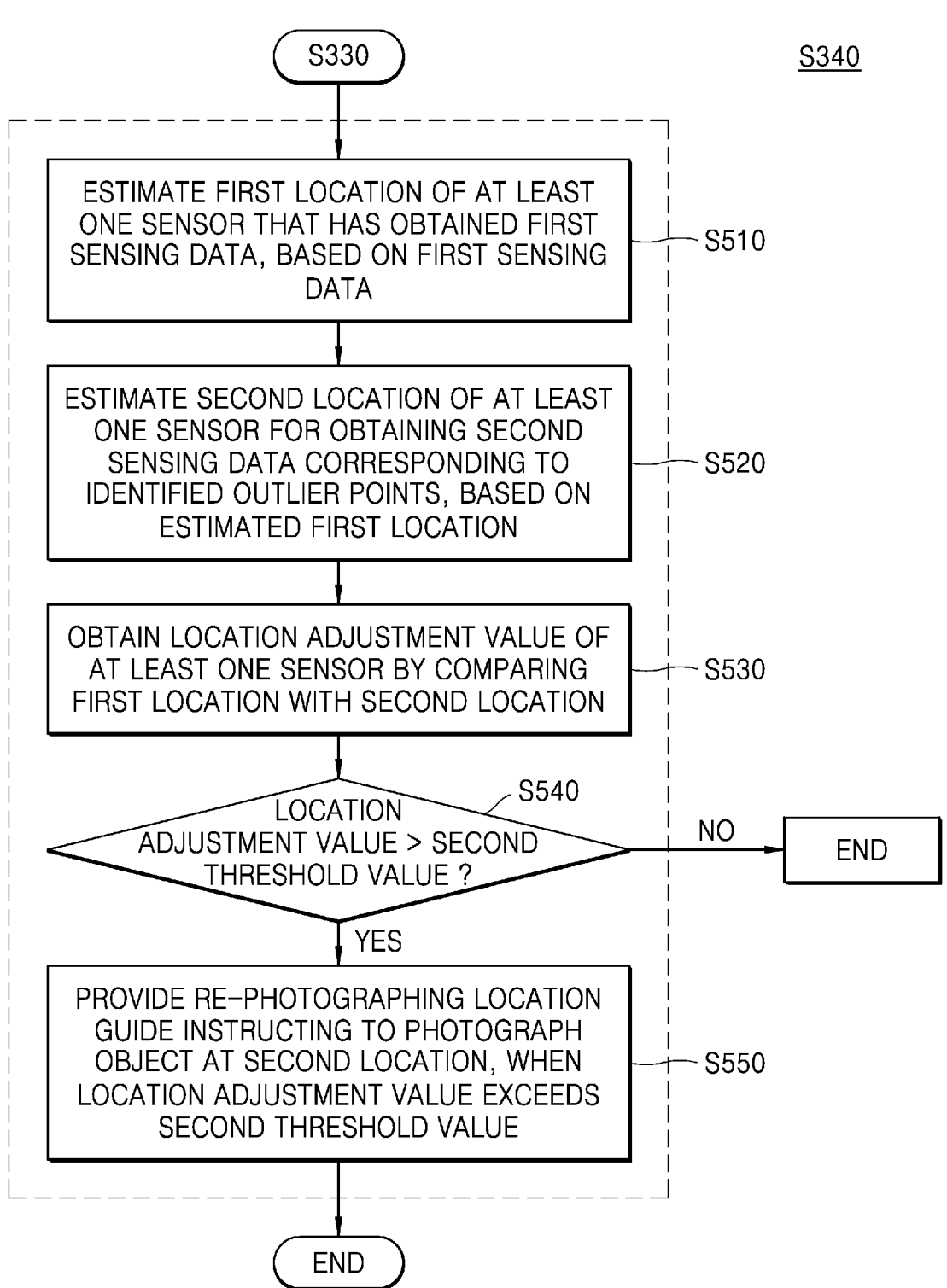
FIG. 5B illustrates a method of providing the re-photographing location guide of FIG. 5A.

FIG. 5B is a flowchart of a method of providing the re-photographing location guide of FIG. 5A. Matters of FIG. 5B that are the same as those described above with reference to FIGS. 1 through 3 and FIG. 5A will not be repeated herein. For convenience of description, FIG. 5B will be described with reference to FIGS. 2A through 3 and FIG. 5A.

Referring to FIG. 5B, operation S340 of FIG. 3 may include operations S510 through S550. According to an embodiment of the disclosure, operations S410 through S450 may be performed by the electronic device 200 or the processor 270 of the electronic device 200. Sub-operations of operation S340 according to the disclosure are not limited to those shown in FIG. 5B. In one embodiment, any of the operations shown in FIG. 5B may be omitted. In one embodiment, the sub-operations in FIG. 5B may further include operations that are well-known to a person having ordinary skill in the art.

In operation S510, the electronic device 200 may estimate a first location of the at least one sensor 210 that has obtained the first sensing data, based on the first sensing data. For example, the electronic device 200 may determine the location of the at least one sensor 210, based on a single image or a plurality of images. The electronic device 200 may estimate feature points from the single image or the plurality of images. The electronic device 200 may estimate the first location of the at least one sensor 210 by using the estimated feature points and/or specifications (e.g., a focal length) of the at least one sensor 210.

In operation S520, the electronic device 200 may estimate a second location of at least one sensor for obtaining second sensing data corresponding to the identified at least one outlier point, based on the estimated first location. For example, the second sensing data may correspond to the partial area 502 of the object. For example, the second location may correspond to the specific location A1 for photographing the partial area 502 of the object.

In operation S530, the electronic device 200 may obtain a location adjustment value of the at least one sensor 210 by comparing the first location with the second location. For example, the location adjustment value may represent at least one of a distance between the first location and the second location or an angular difference therebetween.

In operation S540, the electronic device 200 may determine whether the location adjustment value exceeds a second threshold value. When the location adjustment value is less than or equal to the second threshold value (No), the method is concluded. When the location adjustment value exceeds the second threshold value (Yes), the method proceeds to operation S550 without being concluded.

In operation S550, the electronic device 200 may provide a re-photographing location guide instructing to photograph the object at the second location.

According to an embodiment of the disclosure, the sub-operations of operation S340 of FIG. 4B and the sub-operations of operation S340 of FIG. 5B may be performed in parallel by the electronic device 200. However, the disclosure is not limited thereto, and at least one of the sub-operations of operation S340 of FIG. 4B or at least one of the sub-operations of operation S340 of FIG. 5B may be performed in series by the electronic device 200.

Figure 6A:
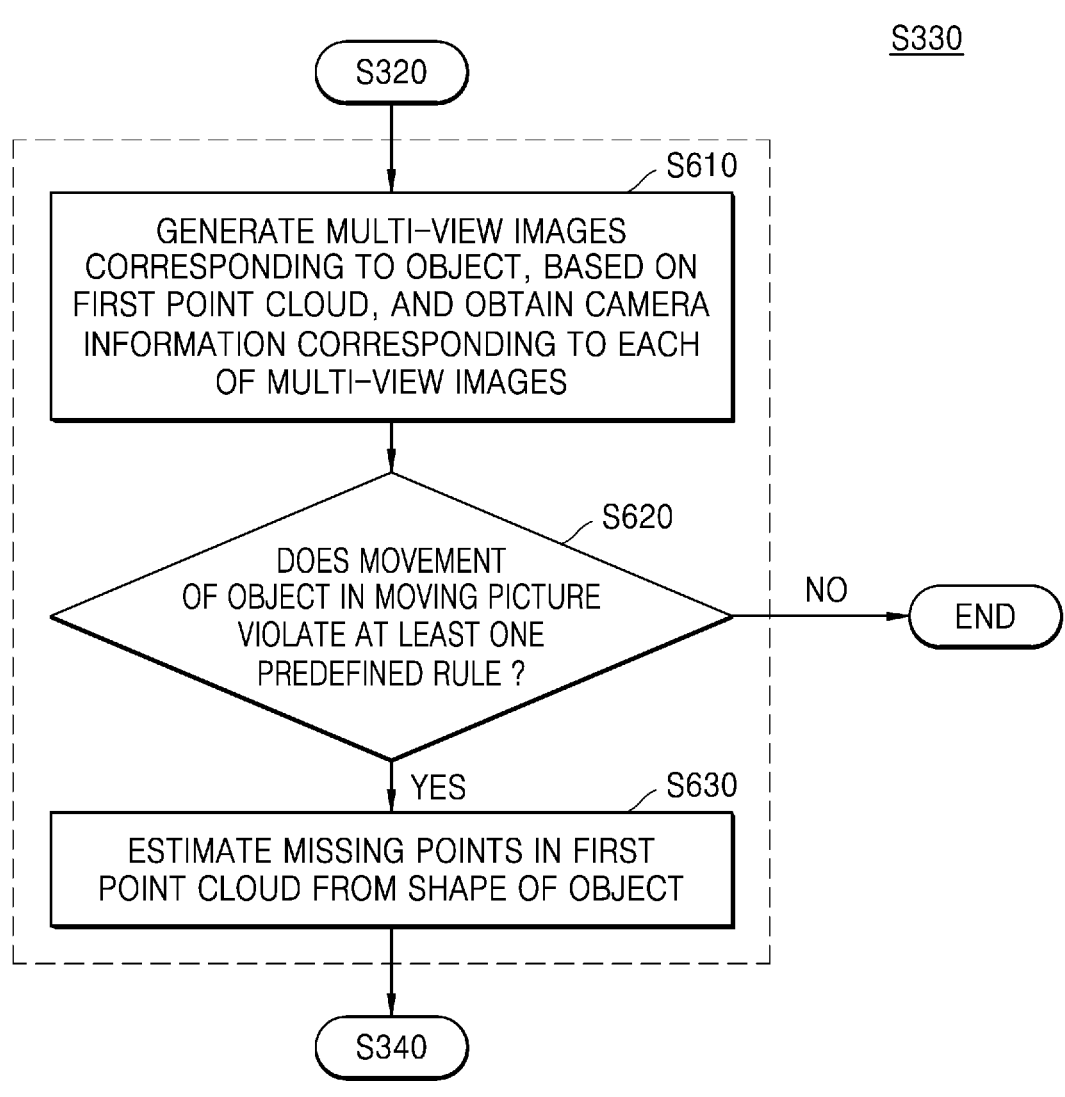
FIG. 6A illustrates a method of identifying a portion violating the predefined rule from a point cloud, according to an embodiment of the disclosure.

FIG. 6A is a flowchart of a method of identifying a portion violating the predefined rule from a point cloud, according to an embodiment of the disclosure. Matters of FIG. 6A that are the same as those described above with reference to FIGS. 1 through 3 will not be repeated herein. For convenience of description, FIG. 6A will be described with reference to FIGS. 2A through 3.

Referring to FIG. 6A, operation S330 of FIG. 3 may include operations S610 through S630. According to an embodiment of the disclosure, operations S610 through S630 may be performed by the electronic device 200 or the processor 270 of the electronic device 200. Sub-operations of operation S330 according to the disclosure are not limited to those shown in FIG. 6A. In one embodiment, any of the operations shown in FIG. 6A may be omitted. In one embodiment, the sub-operations of FIG. 6A may further include operations that are well-known to the ordinary skill in the art.

In operation S610, the electronic device 200 may generate multi-view images corresponding to the object, based on a first point cloud, and may obtain camera information corresponding to each of the multi-view images. For example, the camera information may include a camera position in a 3D coordinate system and a focal length of a camera. To generate the multi-view images, the electronic device 200 may generate a mesh corresponding to the object, based on the first point cloud, and may render the mesh into 2D images.

In operation S620, the electronic device 200 may infer whether a movement of the object in the moving picture composed of the multi-view images violates at least one predefined rule, by applying the moving picture to the at least one artificial intelligence model 231. The at least one artificial intelligence model 231 may be trained to infer whether a movement of an object in an image sequence violates at least one predefined rule, by using, as training data, a data set including an image sequence that violates at least one predefined rule and an image sequence that does not violate the at least one predefined rule. When the movement of the object does not violate the at least one predefined rule (No), the method is concluded. When the movement of the object violates the at least one predefined rule (Yes), the method is not concluded and proceeds to operation S630.

In operation S630, the electronic device 200 may estimate missing points from the first point cloud, based on a result of the inference. The missing points in the first point cloud may be estimated by inversely calculation from an output of the at least one artificial intelligence model 231. Sub-operations of operation S630 will be described in more detail with reference to FIG. 7A.

Figure 6B:
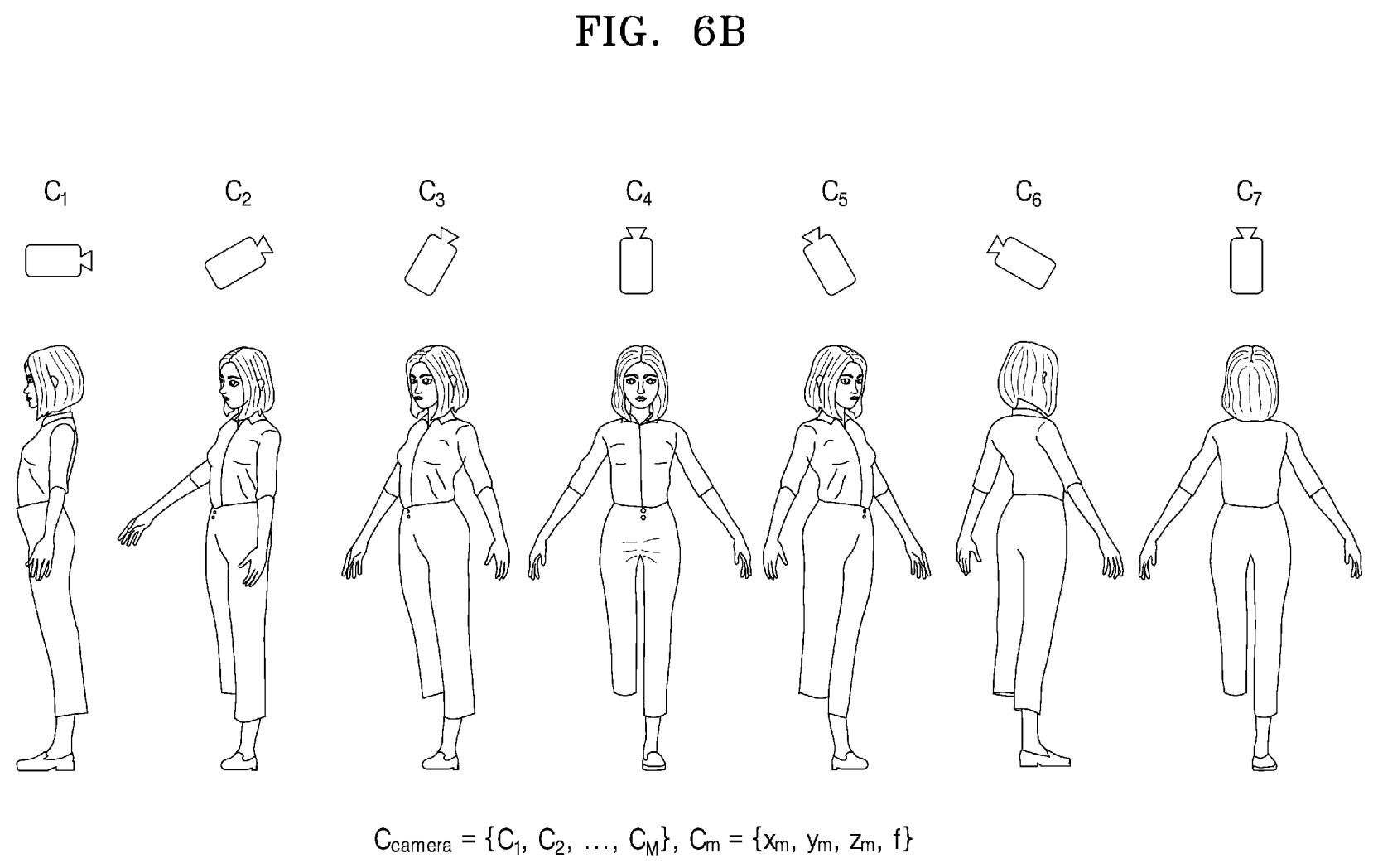

FIG. 6B illustrates a method of generating multi-view images and obtaining camera information, according to an embodiment of the disclosure. Matters of FIG. 6B that are the same as those described above with reference to FIGS. 1 through 3 and FIG. 6A will not be repeated herein. For convenience of description, FIG. 6B will be described with reference to FIGS. 2A and 2B.

Referring to FIG. 6B, the electronic device 200 may generate multi-view images generated by cameras corresponding to a camera information set $C_{Camera}$. The camera information set $C_{camera}$ may include respective pieces of camera information $C_1$ through $C_M$ of M cameras. Here, M may be a natural number. For example, the camera information $C_m$ may include locations $x_m$, $y_m$, and $z_m$ of a camera in a 3D coordinate system. The camera information $C_m$ may include a focal length f of the camera. Here, m is a unique value of a camera having a specific direction, angle, and location, and may be a natural number less than or equal to M. For convenience of description, only images interpreted as being captured from seven viewpoints are shown, but the number of viewpoints is not limited thereto.

The electronic device 200 may compose the multi-view images into a moving picture according to continuous rotations of the camera. Accordingly, each of the frames of the moving picture may be an image according to continuous and/or linear rotation of the camera.

Figure 7A:
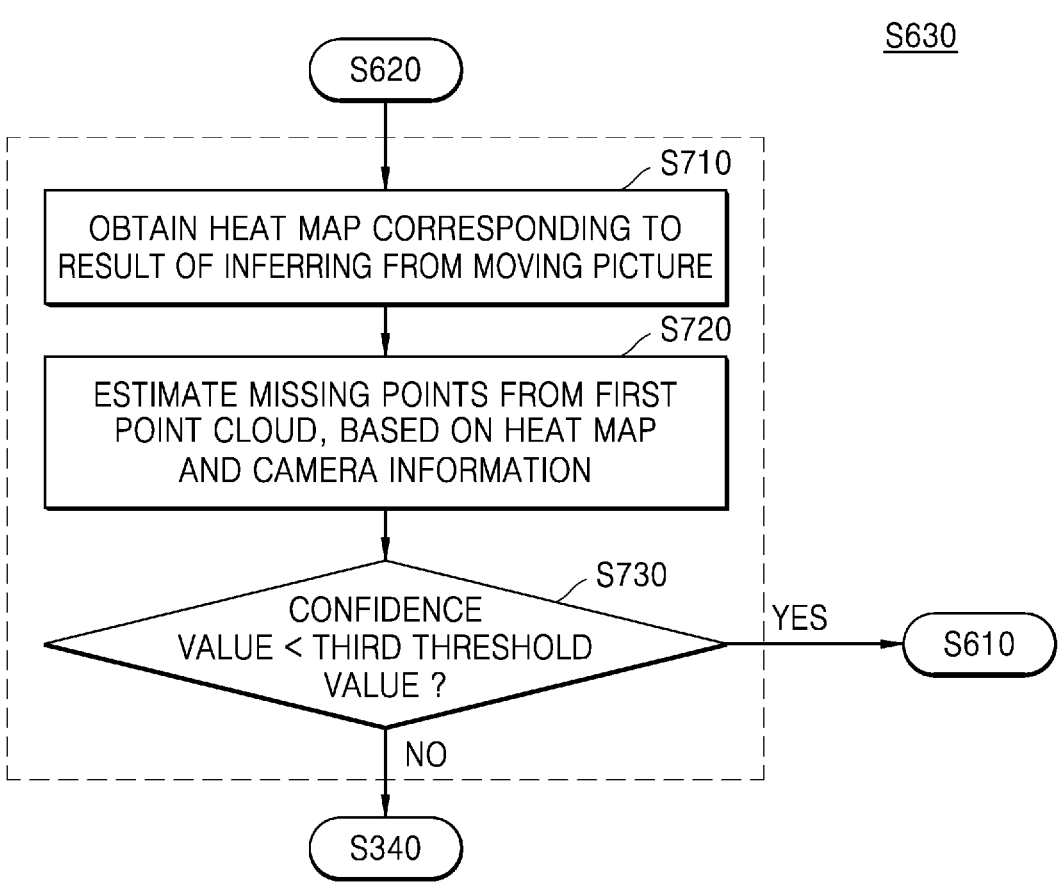
FIG. 7A illustrates a method of estimating missing points from a point cloud, according to an embodiment of the disclosure.

FIG. 7A is a flowchart of a method of estimating missing points from a point cloud, according to an embodiment of the disclosure. Matters of FIG. 7A that are the same as those described above with reference to FIGS. 1 through 3 and FIG. 6A will not be repeated herein. For convenience of description, FIG. 7A will be described with reference to FIGS. 2A through 3 and FIG. 6A.

Referring to FIG. 7A, operation S630 of FIG. 3 may include operations S710 through S730. According to an embodiment of the disclosure, operations S710 through S730 may be performed by the electronic device 200 or the processor 270 of the electronic device 200. Sub-operations of operation S630 according to the disclosure are not limited to those shown in FIG. 7A. In one embodiment, any of the operations shown in FIG. 7A may be omitted. In one embodiment, the sub-operations of FIG. 7A may further include operations that are well-known to a person having ordinary skill in the art.

In operation S710, after operation S620 of FIG. 6A, the electronic device 200 may obtain, from the moving picture, a heat map corresponding to a result of inferring whether the movement of the object in the moving picture violates the at least one predefined rule. The electronic device 200 may obtain a heat map corresponding to each of the frames of the moving picture. For example, the electronic device 200 may determine a layer (e.g., a last layer) from which the heat map is to be extracted from the output of the at least one artificial intelligence model 231. The electronic device 200 may determine the layer according to the user or the manufacturer' setting. The electronic device 200 may extract an activation value from the determined layer. The electronic device 200 may generate the heat map, based on the extracted activation value. For example, the electronic device 200 may configure the heat map with points whose activation values exceed a predefined threshold value.

In operation S720, the electronic device 200 may estimate missing points from the first point cloud among the shape of the object, based on the heat map and the camera information. According to an embodiment of the disclosure, the electronic device 200 may convert points on a frame of the moving picture into points of the 3D coordinate system, based on the heat map and the camera information.

In operation S730, the electronic device 200 may determine whether a confidence value of a result of the estimation is less than a third threshold value. The confidence value may represent a degree to which the points of a transformed 3D coordinate system correspond to the heat map. For example, when it is determined that missing points estimated based on the heat map of one of the frames of the moving picture are the same as or similar to missing points estimated based on the heat map of another of the frames of the moving picture, the confidence value corresponding to the estimated missing points may be high. According to an embodiment of the disclosure, the above-described determination may be performed based on a predefined threshold value.

When the confidence value is less than the third threshold value (Yes), the method proceeds to operation S610. Accordingly, when the confidence value is less than the third threshold value, the electronic device 200 may additionally generate multi-view images at a viewpoint corresponding to an area determined to have a low confidence value.

When the confidence value is equal to or greater than the third threshold value (No), the method proceeds to operation S340.

Figure 7B:
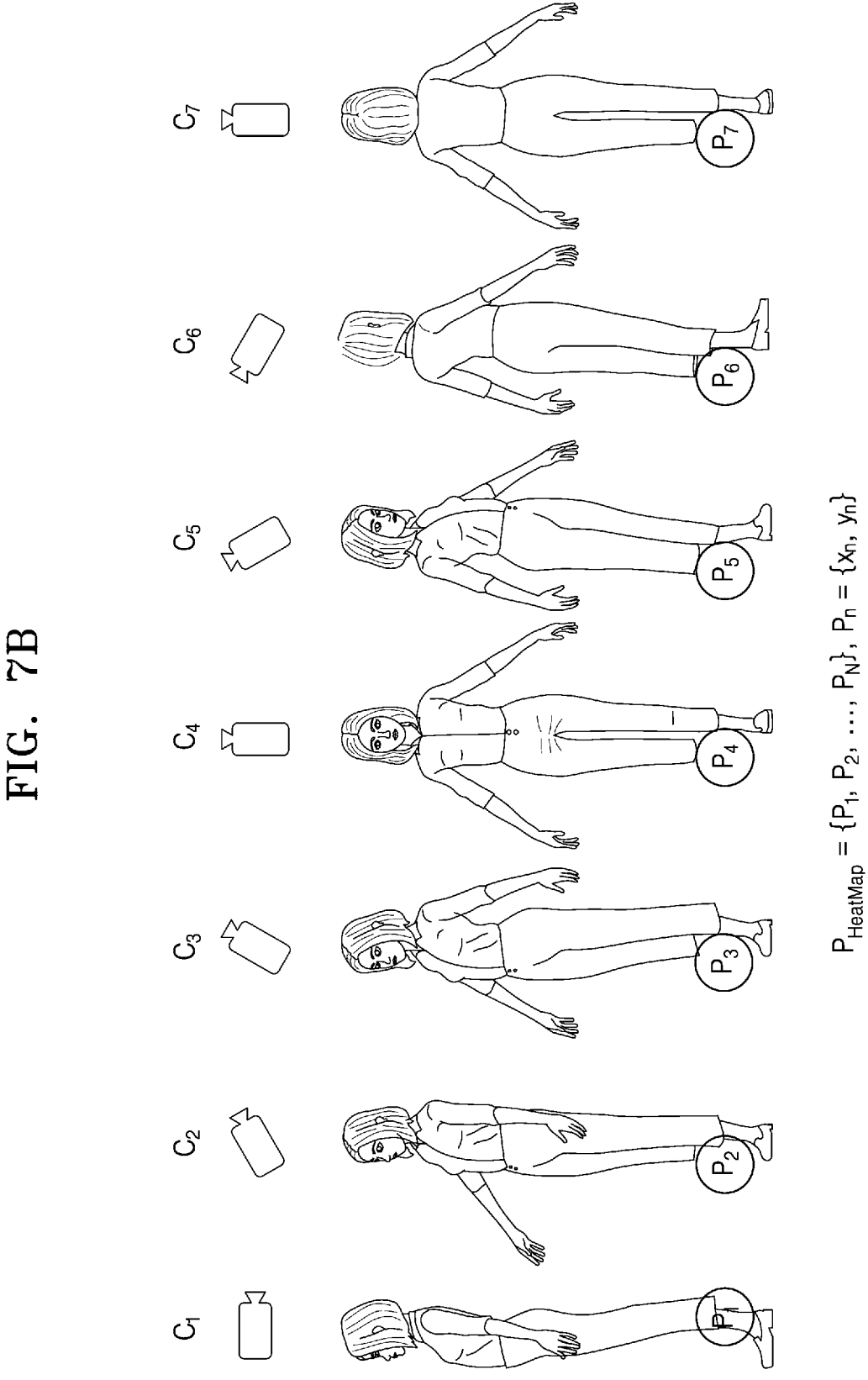
FIG. 7B illustrates heat maps of multi-view images, according to an embodiment of the disclosure.

FIG. 7B illustrates the heat maps of multi-view images according to an embodiment of the disclosure. Matters of FIG. 7B that are the same as those described above with reference to FIGS. 1 through 3 and FIGS. 6A and 7A will not be repeated herein. For convenience of description, FIG. 7B will be described with reference to FIGS. 2A through 3 and FIG. 6B.

Referring to FIG. 7B, the electronic device 200 may obtain a heat map corresponding to each of the frames (e.g., multi-view images) of the moving picture. A heat map set $P_{HeatMap}$ may include heat maps $P_1$ through $P_N$ corresponding to the frames of the moving picture. N may be the number of frames that constitute the moving picture. Here, N may be a natural number. According to an embodiment of the disclosure, N may be the same as M. A heat map Pn may be composed of a set of coordinate values in a moving picture frame. The pieces of camera information $C_1$ through $C_7$ may correspond to the heat maps $P_1$ through $P_7$.

Regarding the frames of the moving picture shown in FIG. 7B, the moving picture may be composed of images obtained by photographing an object (i.e., a person) at various viewpoints. Each of the heat maps $P_1$ through $P_7$ may be a set of missing points in the shape of an object expressed in a frame of the moving picture. Thus, the electronic device 200 may infer that the moving picture (the movement of the object in the moving picture) has a portion that violates at least one predefined rule, by using the at least one artificial intelligence model 231.

FIGS. 8A through 8D are conceptual views for explaining the type of predefined rule according to an embodiment of the disclosure.

Figure 8A:
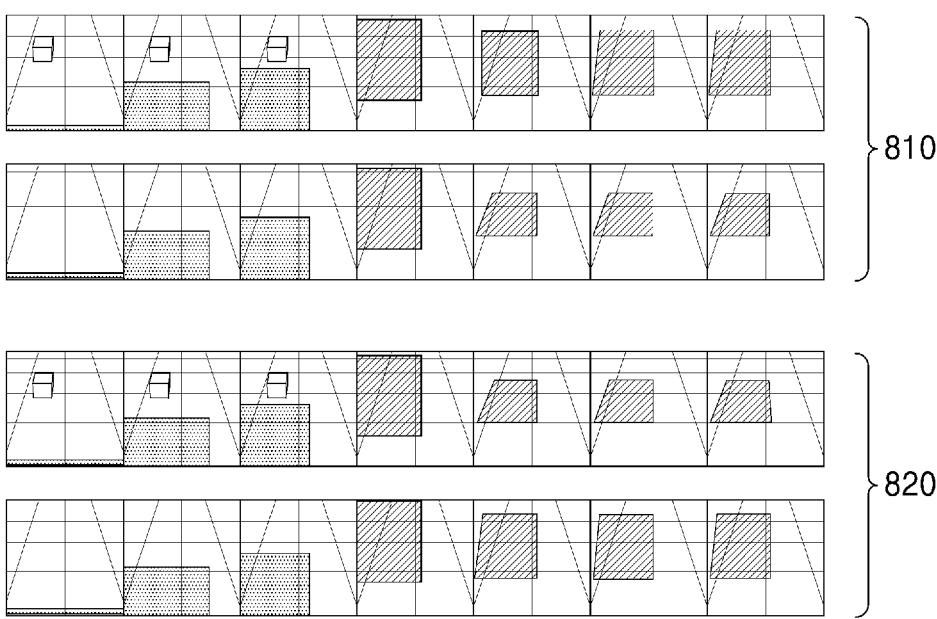
FIGS. 8A through 8D illustrates views for explaining types of predefined rules according to an embodiment of the disclosure.

Referring to FIG. 8A, a first predefined rule may include object persistence. In the disclosure, the object persistence may represent a property that an object maintains its shape, size, position, and motion state for a certain period of time. The object persistence may indicate that the state of an observed object does not change over time.

A first scenario 810 represents an exemplary scenario in which object persistence is not violated. A first image sequence of the first scenario 810 corresponds to a situation in which a board covers a cube object while falling down. Because there is a cube object under the fallen board, the board does not completely touch the floor. A second image sequence of the first scenario 810 corresponds to a situation in which a board falls down but no cube objects exist. Because nothing exists under the fallen board, the board completely touches the floor.

A second scenario 820 represents an exemplary scenario in which object persistence is violated. A first image sequence of the second scenario 820 corresponds to a situation in which a board covers a cube object while falling down. Because there is a cube object under the fallen board, the board should not completely touch the floor, but the board completely touches the floor. A second image sequence of the second scenario 820 corresponds to a situation in which a board falls down but no cube objects exist. Because nothing exists under the fallen board, the board should completely touch the floor, but the board does not completely touch the floor.

Referring to FIGS. 2A and 2B together with FIG. 8A, the first scenario 810 may be an example of an image sequence included in a training data set that does not violate object persistence. The second scenario 820 may be an example of an image sequence included in a training data set that violates object persistence.

Figure 8B:
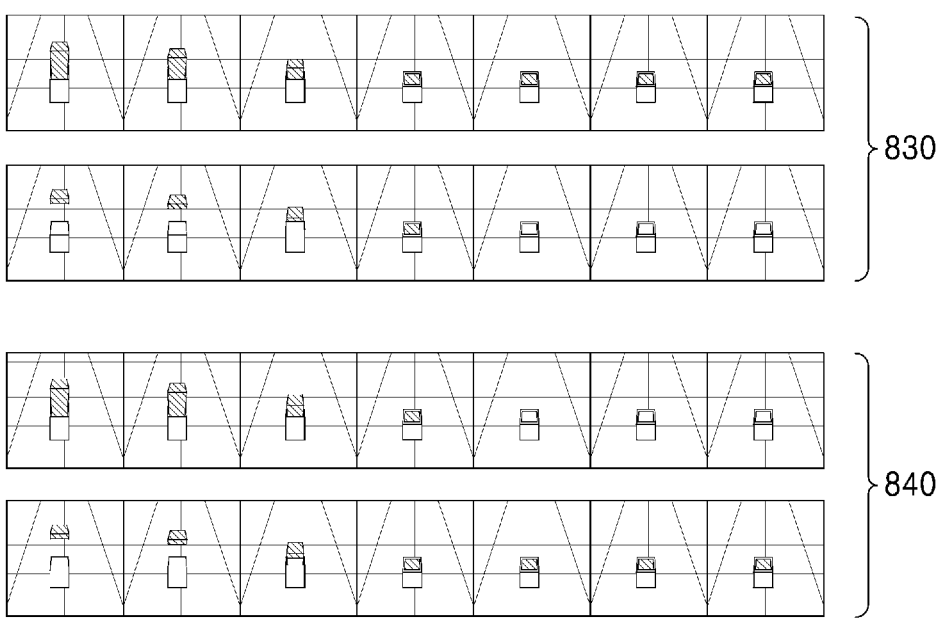

Referring to FIG. 8B, a second predefined rule may include solidity. In the disclosure, solidity may represent a property that hard objects may not pass through each other and objects pass through each other when having empty spaces.

A third scenario 830 represents an exemplary scenario in which solidity is not violated. A first image sequence of the third scenario 830 corresponds to a situation in which a long cube object enters an empty barrel. A cube object passes through an empty barrel, and the cube object hits a hard bottom of the barrel and may not pass through any more. A second image sequence of the third scenario 830 corresponds to a situation in which a short cube object enters an empty barrel. A cube object passes through an empty barrel, and the cube object hits a hard bottom of the barrel. However, because the cube object has a small length, the figure of the cube object having entered in the empty barrel is not seen from a current angle.

A fourth scenario 840 represents an exemplary scenario in which solidity is violated. A first image sequence of the fourth scenario 840 corresponds to a situation in which a long cube object enters an empty barrel. The cube object passes through the empty barrel, and the cube object should hit the hard bottom of the barrel and should not pass through any more. However, the cube object passes through the hard bottom of the barrel. A second image sequence of the fourth scenario 840 corresponds to a situation in which a short cube object enters an empty barrel. The cube object passes through the empty barrel, and the cube object should hit the hard bottom of the barrel and thus the figure of the cube object having entered in the empty barrel should not be seen from a current angle. However, the cube object does not sufficiently pass through the empty barrel.

Referring to FIGS. 2A and 2B together with FIG. 8B, the third scenario 830 may be an example of an image sequence included in a training data set that does not violate solidity. The fourth scenario 840 may be an example of an image sequence included in a training data set that violates solidity.

Figure 8C:
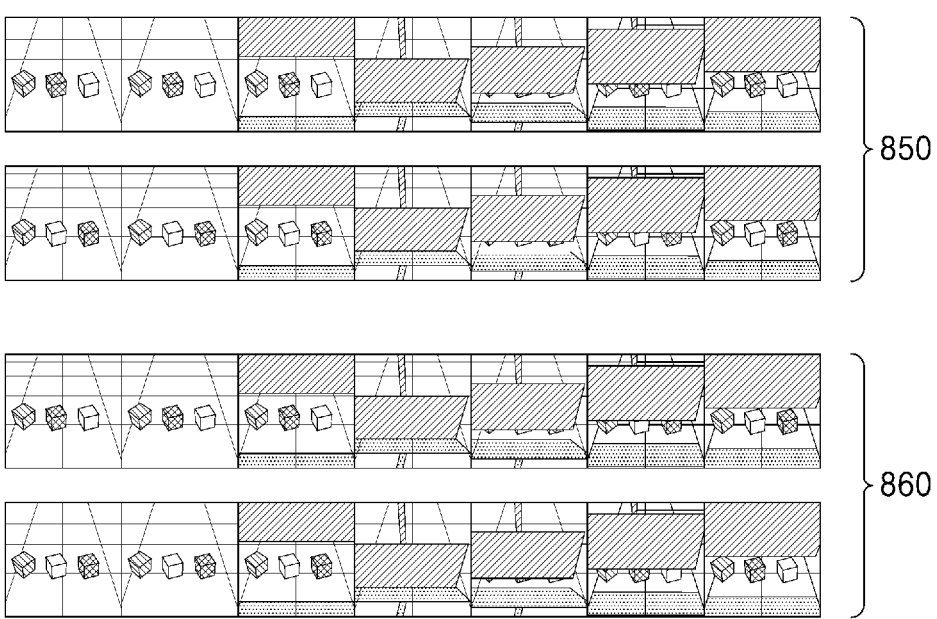

Referring to FIG. 8C, a third predefined rule may include unchangeableness. In the disclosure, unchangeableness may represent a property that the form of an object does not change. For example, the form may include a color, a pattern, and/or a shape.

A fifth scenario 850 represents an exemplary scenario in which unchangeableness is not violated. A first image sequence of the fifth scenario 850 corresponds to a situation in which three cube objects are completely covered by a board and is then shown again. Even when the three cube objects are completely covered by the board, the form of the three cube objects when shown again are the same. A second video sequence of the fifth scenario 850 corresponds to a situation in which the arrangement order of the three cube objects is different from that of the first video sequence. Even when the three cube objects are completely covered by the board, the form of the three cube objects when shown again are the same.

A sixth scenario 860 represents an exemplary scenario in which unchangeableness is violated. A first image sequence of the sixth scenario 860 corresponds to a situation in which three cube objects are completely covered by a board and is then shown again. Even when the three cube objects are completely covered by the board, the forms of the three cube objects when shown again need to be the same. However, the colors of the cube objects before being completely covered by the board are different from those of the three cube objects when shown again. A second video sequence of the sixth scenario 860 corresponds to a situation in which the arrangement order of the three cube objects is different from that of the first video sequence. Even when the three cube objects are completely covered by the board, the forms of the three cube objects when shown again need to be the same. However, the colors of the cube objects before being completely covered by the board are different from those of the three cube objects when shown again.

Referring to FIGS. 2A and 2B together with FIG. 8C, the fifth scenario 850 may be an example of an image sequence included in a training data set that does not violate unchangeableness. The sixth scenario 860 may be an example of an image sequence included in a training data set that violates unchangeableness.

Figure 8D:
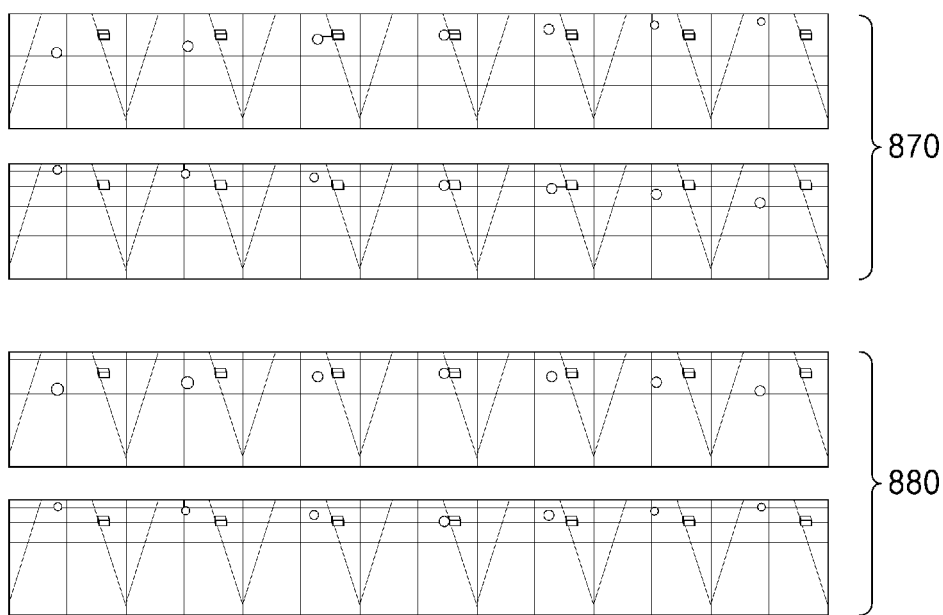

Referring to FIG. 8D, a fourth predefined rule may include directional inertia. In the disclosure, directional inertia may represent a property that a moving object moves appropriately while having directional inertia.

A seventh scenario 870 represents an exemplary scenario in which directional inertia is not violated. A first image sequence of the seventh scenario 870 corresponds to a situation in which a spherical object moves in a specific direction, collides with a fixed cube object, changes its direction, and maintains a motion direction. In view of the angle at which the spherical object collides with the fixed cube object, the motion direction of the spherical object after the collision is appropriate. A second video sequence of the seventh scenario 870 corresponds to a situation in which the motion directions of the spherical object before and after the collision are opposite to each other. In view of the angle at which the spherical object collides with the fixed cube object, the motion direction of the spherical object after the collision is appropriate.

An eighth scenario 880 represents an exemplary scenario in which directional inertia is violated. A first image sequence of the eighth scenario 880 corresponds to a situation in which a spherical object moves in a specific direction, collides with a fixed cube object, changes its direction, and maintains a motion direction. In view of the angle at which the spherical object collides with the fixed cube object, the motion direction of the spherical object after the collision is inappropriate. A second video sequence of the eighth scenario 880 corresponds to a situation in which the motion directions of the spherical object before and after the collision are opposite to each other. In view of the angle at which the spherical object collides with the fixed cube object, the motion direction of the spherical object after the collision is inappropriate.

Referring to FIGS. 2A and 2B together with FIG. 8D, the seventh scenario 870 may be an example of an image sequence included in a training data set that does not violate directional inertia. The eighth scenario 880 may be an example of an image sequence included in a training data set that violates directional inertia.

Figure 9:
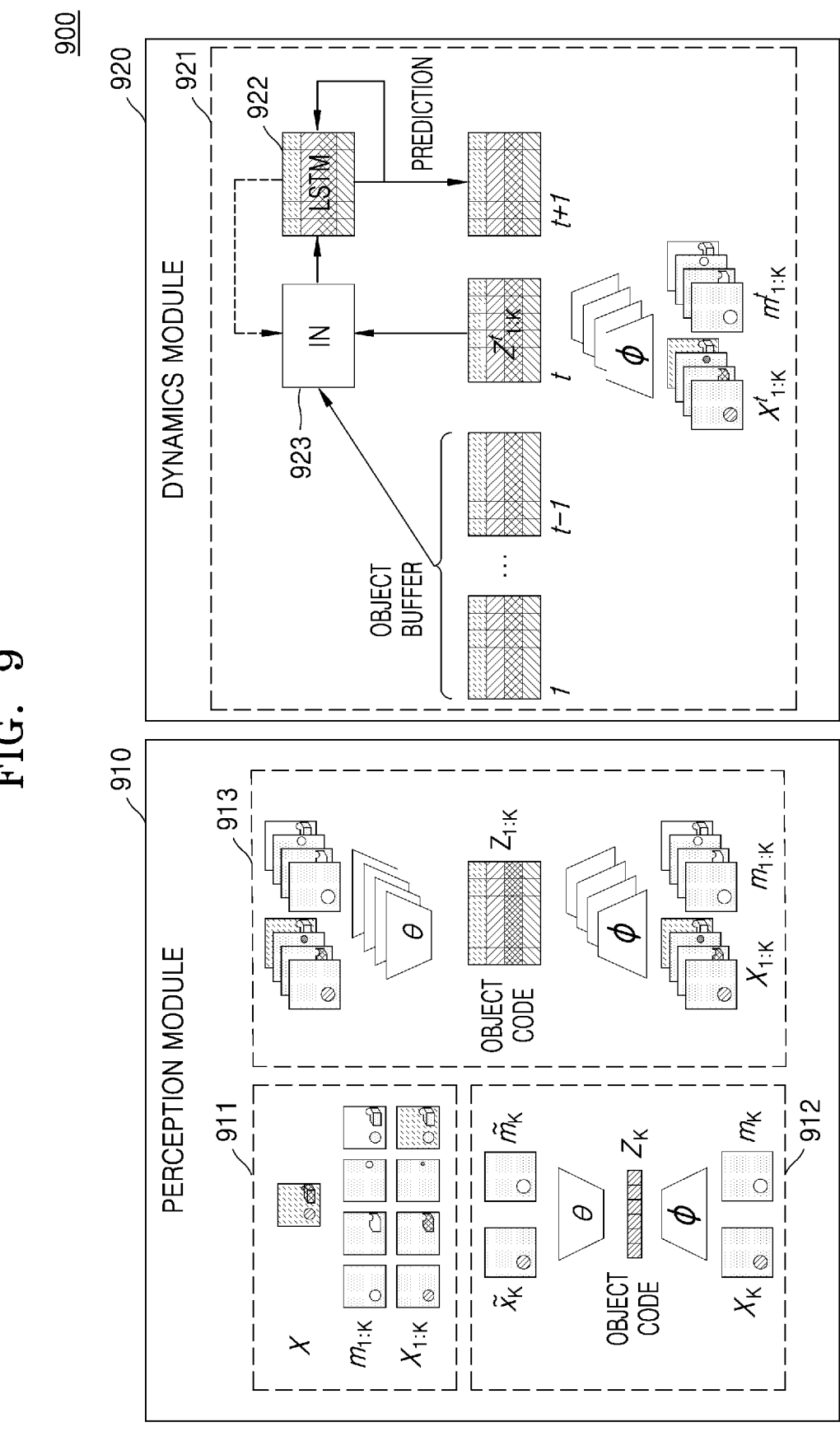
FIG. 9 is illustrates a structure of an artificial network model (e.g., a deep neural network model) according to an embodiment of the disclosure.

FIG. 9 illustrates a structure of an artificial intelligence model according to an embodiment of the disclosure. A configuration, an operation, and a function of an artificial intelligence model 900 may correspond to a configuration, an operation, and a function of the at least one artificial intelligence model 231 of FIGS. 2A and 2B. For convenience of explanation, matters of FIG. 9 that are the same as those described above with reference to FIGS. 1 through 8 will not be repeated herein.

According to an embodiment of the disclosure, the artificial intelligence model 900 may include a perception module 910 and a dynamics module 920. The perception module 910 may perform a first operation 911, a second operation 912, and a third operation 913. The dynamics module 920 may perform a fourth operation 921.

The first operation 911 may be an operation of preprocessing input data. In the first operation 911, the perception module 910 may receive an image x. For example, the image x may be one frame within a moving picture. For example, the image x may be one of the multi-view images described above with reference to FIGS. 6A through 7B. According to an embodiment of the disclosure, the perception module 910 may generate a segmentation mask $m_{1:K}$ corresponding to each object, based on the image x. The perception module 910 may output an image set $X_{1:K}$ including only a visible portion of each object by performing an elementwise product on the image x and a segmentation mask $m_{1:K}$.

The second operation 912 may be an operation of training an encoder module $\phi$ and a decoder module $\theta$. In the second operation 912, the perception module 910 may encode an original pair (e.g., $X_k$ and $m_K$) among the image set $X_{1:K}$ and the segmentation mask $m_{1:K}$ into an object code $z_k$ by using the encoder module $\phi$. The perception module 910 may encode the object code $z_k$ into a reconstructed pair $\widetilde{X_k}$, $\widetilde{m_k}$ by using the decode module $\theta$. A discrepancy degree between the original pair (e.g., $X_k, m_K$) and the reconstructed pair $\widetilde{X_k}$, $\widetilde{m_k}$ may be used to learn parameters of the encoder module $\phi$ and $\theta$ parameters of the decoder module so that the object code $z_k$ may represent useful information of an image-mask pair. According to an embodiment of the disclosure, the encoder module $\phi$ and the decoder module $\theta$ may have an auto-encoder structure.

The third operation 913 may be an operation of outputting object codes by using the trained artificial intelligence model 900. In the third operation 913, the perception module 910 may encode original pairs $(X_{1:K}, m_{1:K})$ into object codes $z_{1:K}$ by using trained encoder modules $\phi$. According to an embodiment of the disclosure, the perception module 910 may decode the object codes $z_{1:K}$ into reconstructed pairs $\widetilde{X_k}$, $\widetilde{m_k}$, by using trained decoder modules $\theta$. According to an embodiment of the disclosure, one of the object codes may correspond to one object in one frame of a moving picture.

The fourth operation 921 may be an operation of predicting (or inferring) an object code of a next frame of the moving picture by using the trained artificial intelligence model 900. For example, the moving picture may be a moving picture composed of the multi-view images described above with reference to FIGS. 6A through 7B. The dynamics module 920 may obtain object codes $z_{1:K}^t$ of a t-th viewpoint frame corresponding to the original pairs $X_{1:K}^t$, $m_{1:K}^t$ of the t-th viewpoint frame. An object buffer may store object codes of first through (t−1)th viewpoint frames. The dynamics module 920 may predict (or infer) object codes of a (t+1)th viewpoint frame, based on the object codes of the first through (t−1)th viewpoint frames stored in the object buffer and the object codes $z_{1:K}^t$ of t-th viewpoint frames. According to an embodiment of the disclosure, the dynamics module 920 may be trained to infer the object code of a next frame, based on object codes of frames at previous viewpoints and an object code of the current frame.

According to an embodiment of the disclosure, the dynamics module 920 may include an object memory 922 and an interaction network 923. For example, the object memory 922 may include long short-term memory (LSTM). For example, the object memory 922 may include slots corresponding to each object. Predicted object codes may be stored in the object memory 922. The interaction network 923 may calculate interaction between the object codes of the first through (t−1)th view frames, the object codes $z_{1:K}^t$ of the t-th viewpoint frames, and object codes stored in the object memory 922. The dynamics module 920 may predict (or infer) the object codes of the (t+1)th frame, based on the calculated interaction.

According to an embodiment of the disclosure, the electronic device 200 or the external electronic device may select one of a plurality of predefined rules, based on a user input and/or a manufacturer's setting. By applying an image sequence violating the selected predefined rule and/or an image sequence not violating the selected predefined rule to an artificial intelligence model, the electronic device 200 or the external electronic device may train the artificial intelligence model to obtain object codes corresponding to each of consecutive frames of the image sequence. By applying the object codes to the artificial intelligence model, the electronic device 200 or the external electronic device may train the artificial intelligence model to predict object codes corresponding to a next frame of the consecutive frames.

According to an embodiment of the disclosure, the electronic device 200 or the external electronic device may infer whether a predefined rule is violated, by comparing the predicted object codes with actual object codes corresponding to the next frame of the consecutive frames.

Figure 10:
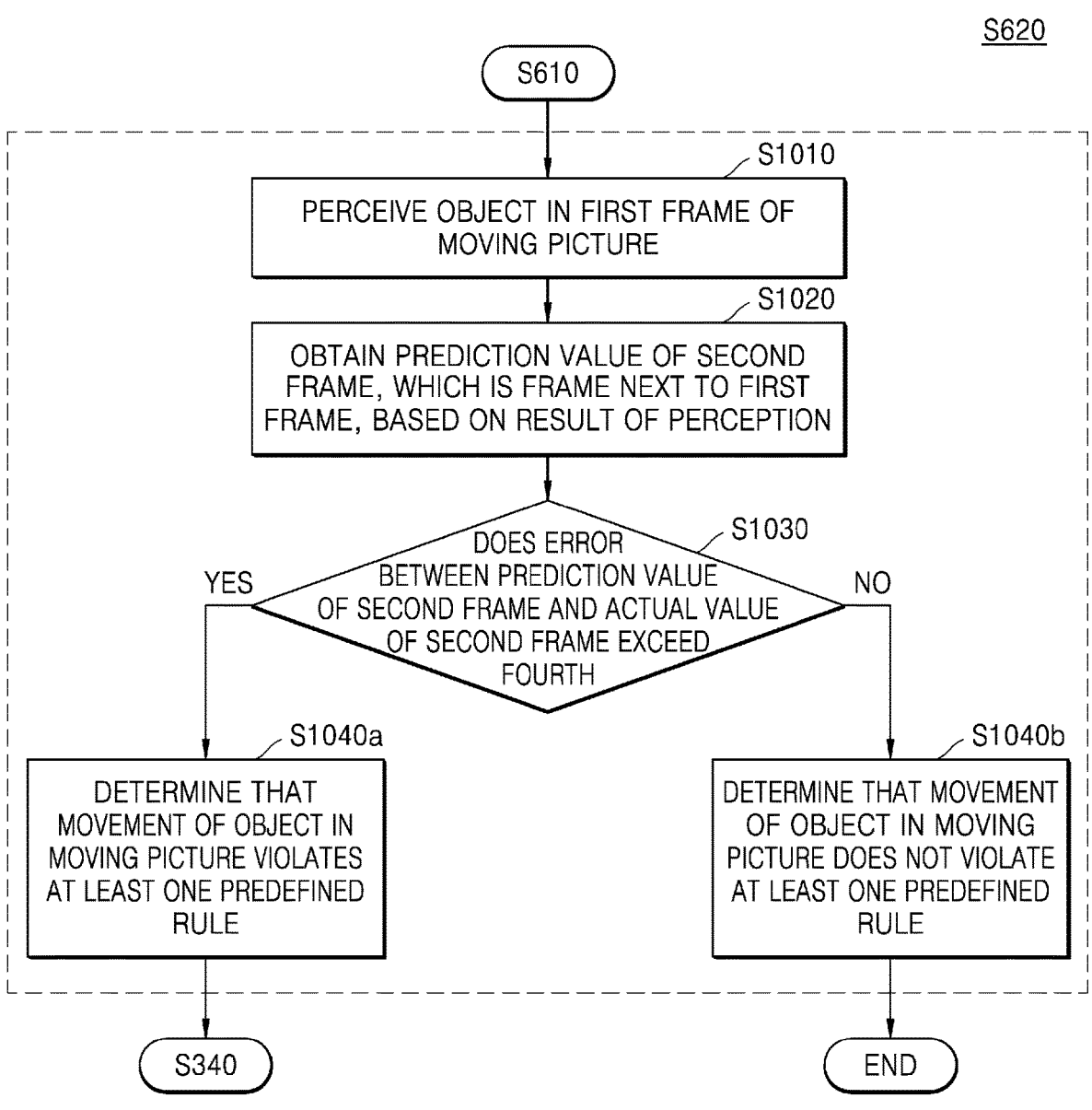
FIG. 10 illustrates an operation of an artificial network model (e.g., a deep neural network model) according to an embodiment of the disclosure.

FIG. 10 is a flowchart of an operation of an artificial intelligence according to an embodiment of the disclosure. Matters of FIG. 10 that are the same as those described above with reference to FIGS. 1 through 3 and FIG. 9 will not be repeated herein. For convenience of description, FIG. 10 will be described with reference to FIGS. 2A through 3 and FIG. 9.

Referring to FIG. 10, operation S620 of FIG. 6 may include operations S1010 through S1040b. According to an embodiment of the disclosure, operations S1010 through S1040b may be performed by the electronic device 200 or the processor 270 of the electronic device 200. Sub-operations of operation S620 according to the disclosure are not limited to those shown in FIG. 10. In one embodiment, any of the operations shown in FIG. 10 may be omitted. In one embodiment, the sub-operations of FIG. 10 may further include operations that are well-known to a person having ordinary skill in the art.

In operation S1010, the electronic device 200 may perceive an object in a first frame of the moving picture. In the disclosure, object (or thing) perception may refer to an operation of perceiving a motion corresponding to an object in a moving picture. The operation of the electronic device 200 performed in operation S1010 may correspond to an operation of the perception module 910. For example, the electronic device 200 may generate a segmentation mask, based on the first frame. The electronic device 200 may perceive the object of the first frame, based on the first frame and the segmentation mask corresponding to the first frame. For example, a result of the perception may indicate an object code at the t-th viewpoint of FIG. 9. According to an embodiment of the disclosure, the electronic device 200 may perceive the object, based on both the first frame and at least one previous frame of the first frame.

In operation S1020, the electronic device 200 may obtain (or infer) a prediction value of a second frame, which is a frame next to the first frame, based on the result of the perception. To obtain the prediction value of the second frame, the electronic device 200 may use at least one of frames previous to the second frame. The operation of the electronic device 200 performed in operation S1020 may correspond to an operation of the dynamics module 920. For example, the prediction value of the second frame may indicate data obtained by predicting object codes at a $(t+1)^{th}$ viewpoint of FIG. 9.

In operation S1030, the electronic device 200 may determine whether an error between the prediction value of the second frame and an actual value of the second frame exceeds a fourth threshold value. For example, the actual value of the second frame may indicate actual object codes at the $(t+1)^{th}$ viewpoint of FIG. 9. For example, the actual value of the second frame may indicate object codes obtained by inputting a $(t+1)^{th}$ viewpoint frame of the image sequence to the trained encoder module ϕ. According to an embodiment of the disclosure, the error between the prediction value of the second frame and the actual value of the second frame may be calculated from a difference between values corresponding to the object codes of the predicted second frame and values corresponding to the object codes of the actual second frame.

When the error between the prediction value of the second frame and the actual value of the second frame exceeds the fourth threshold value (Yes), the operation proceeds to operation S1040a. When the error between the prediction value of the second frame and the actual value of the second frame is less than or equal to the fourth threshold value (No), the operation proceeds to operation S1040b.

In operation S1040a, the electronic device 200 may determine that a movement of the object in the moving picture violates the at least one predefined rule, and the operation proceeds to operation S340. In operation S1040b, the electronic device 200 may determine that a movement of the object in the moving picture does not violate the at least one predefined rule, and the operation is concluded.

Figure 11:
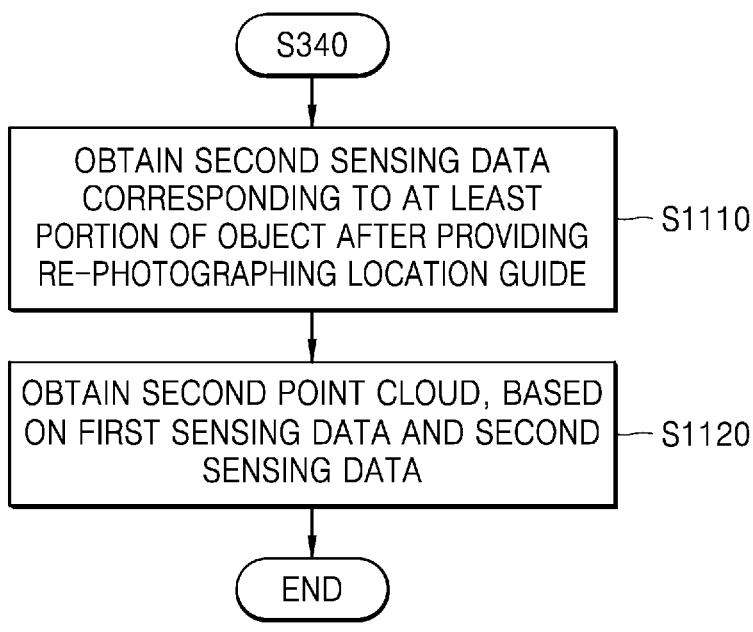
FIG. 11 illustrates a method of generating a point cloud, according to an embodiment of the disclosure.

FIG. 11 is a flowchart of a method of generating a point cloud, according to an embodiment of the disclosure. Matters of FIG. 6A that are the same as those described above with reference to FIGS. 1 through 3 will not be repeated herein. For convenience of description, FIG. 11 will be described with reference to FIGS. 2A through 3.

Referring to FIG. 11, the method of generating a point cloud may include operations S1110 and S1120 after operation S340. According to an embodiment of the disclosure, operations S1110 and S1120 may be performed by the electronic device 200 or the processor 270 of the electronic device 200. A method of generating a point cloud, according to the disclosure, is not limited to those shown in FIG. 11. In one embodiment, any of the operations shown in FIG. 11 may be omitted. In one embodiment, the method may further include operations that are well-known to a person having ordinary skill in the art.

In operation S1110, the electronic device 200 may obtain second sensing data corresponding to at least a portion of the object after providing a re-photographing location guide. According to an embodiment of the disclosure, the user of the electronic device 200 may photograph an object closer or take a picture in a direction different from a direction in which the first sensing data is obtained, according to an instruction corresponding to the re-photographing location guide. The second sensing data may correspond to an image additionally captured by the user.

In operation S1120, the electronic device 200 may obtain a second point cloud, based on the first sensing data and the second sensing data. According to an embodiment of the disclosure, the electronic device 200 may obtain a second point cloud, based on the first point cloud and the second sensing data. The second point cloud may be a complete point cloud representing an object.

Figure 12:
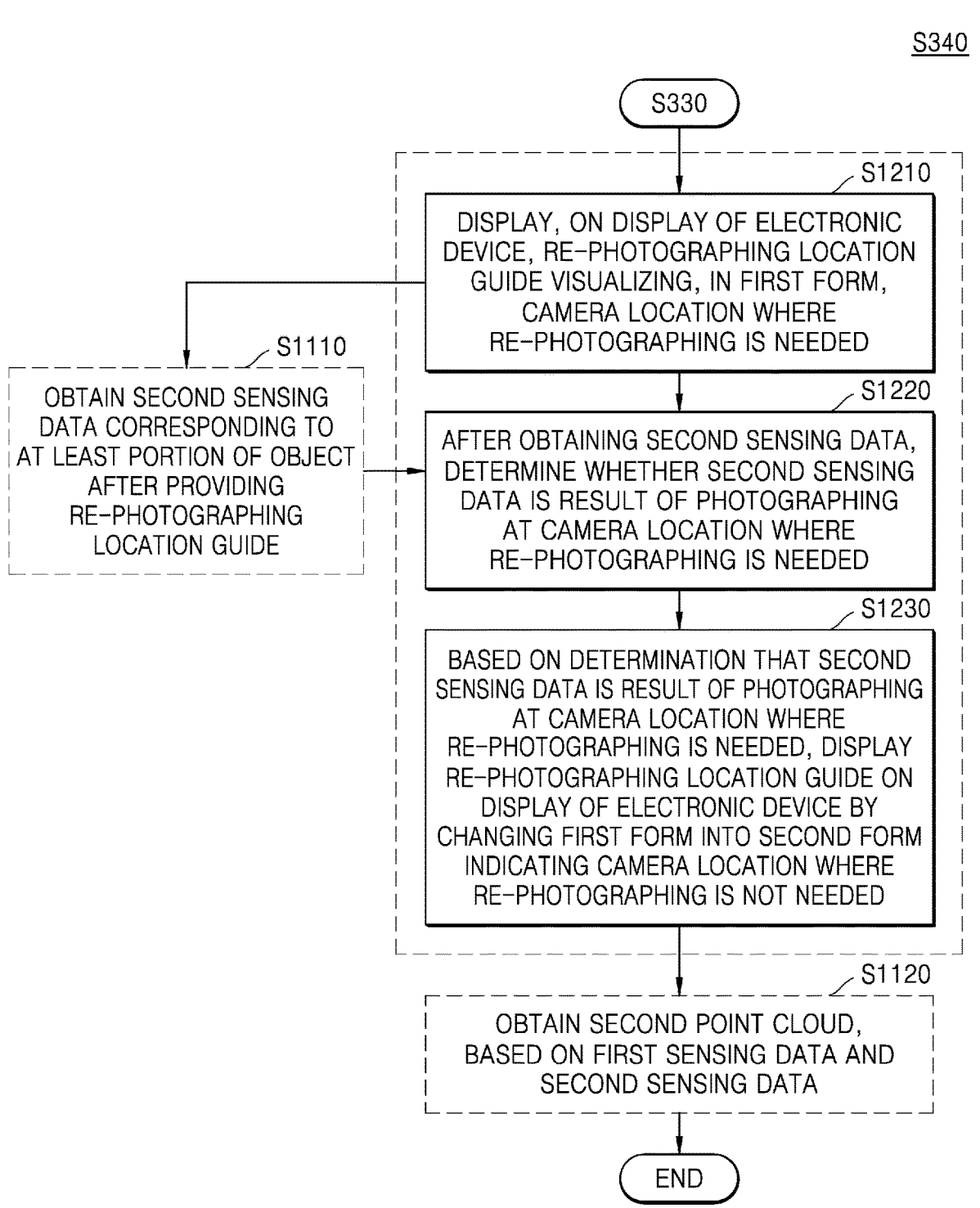
FIG. 12 illustrates a method of providing a re-photographing location guide, according to an embodiment of the disclosure.

FIG. 12 is a flowchart of a method of providing a re-photographing location guide, according to an embodiment of the disclosure. Matters of FIG. 12 that are the same as those described above with reference to FIGS. 1 through 3 and FIG. 11 will not be repeated herein. For convenience of description, FIG. 12 will be described with reference to FIGS. 2A through 3 and FIG. 11.

Referring to FIG. 12, operation S340 of FIG. 3 may include operations S1210 through S1230. According to an embodiment of the disclosure, operations S1210 through S1230 may be performed by the electronic device 200 or the processor 270 of the electronic device 200. Sub-operations of operation S340 according to the disclosure are not limited to those shown in FIG. 12. In one embodiment, any of the operations shown in FIG. 12 may be omitted. In one embodiment, the sub-operation in FIG. 12 may further include operations that are well-known to a person having ordinary skill in the art.

In operation S1210, the electronic device 200 may display, on the display 263 of the electronic device 200, a re-photographing location guide visualizing, in a first form, a first camera location where re-photographing is needed. The user of the electronic device 200 may photograph an object at the first camera location where re-photographing is needed, according to the re-photographing location guide. In operation S1110, the electronic device 200 may obtain second sensing data corresponding to the re-photographing location guide.

In operation S1220, after obtaining the second sensing data corresponding to the re-photographing location guide, the electronic device 200 may determine whether the second sensing data is a result of photographing at the first camera location where re-photographing is needed.

In operation S1230, based on a determination that the second sensing data is a result of photographing at the first camera location where re-photographing is needed, the electronic device 200 may display the re-photographing location guide on the display 263 of the electronic device 200 by changing the first form into a second form indicating a second camera location where re-photographing is not needed. For example, the second form may be a form obtained by changing at least one of the shape, pattern, or color of the first form. In operation S1120, the electronic device 200 may obtain the second point cloud, based on the first sensing data and the second sensing data.

Figure 13A:
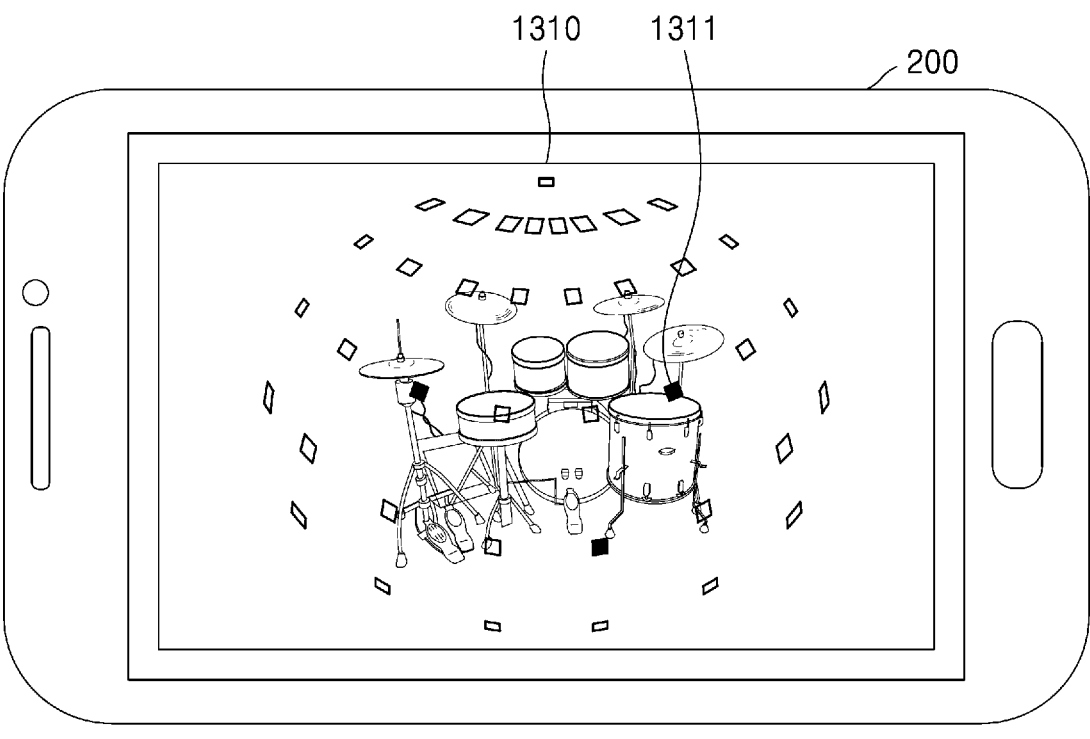
FIGS. 13A through 13C illustrate the method of FIG. 12 of providing a re-photographing location guide.
Figure 13B:
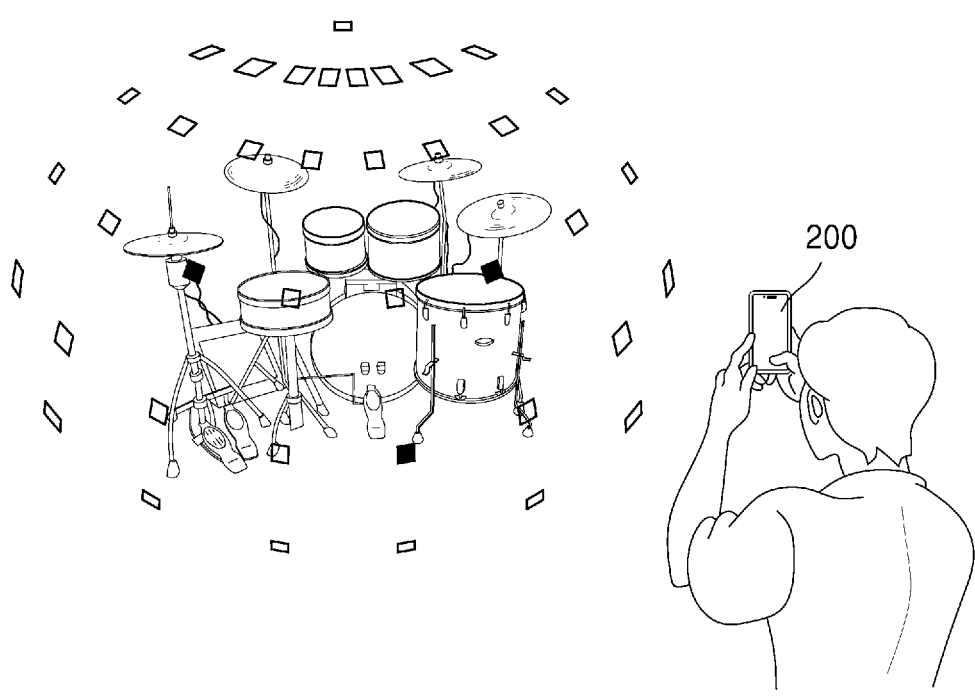
Figure 13C:
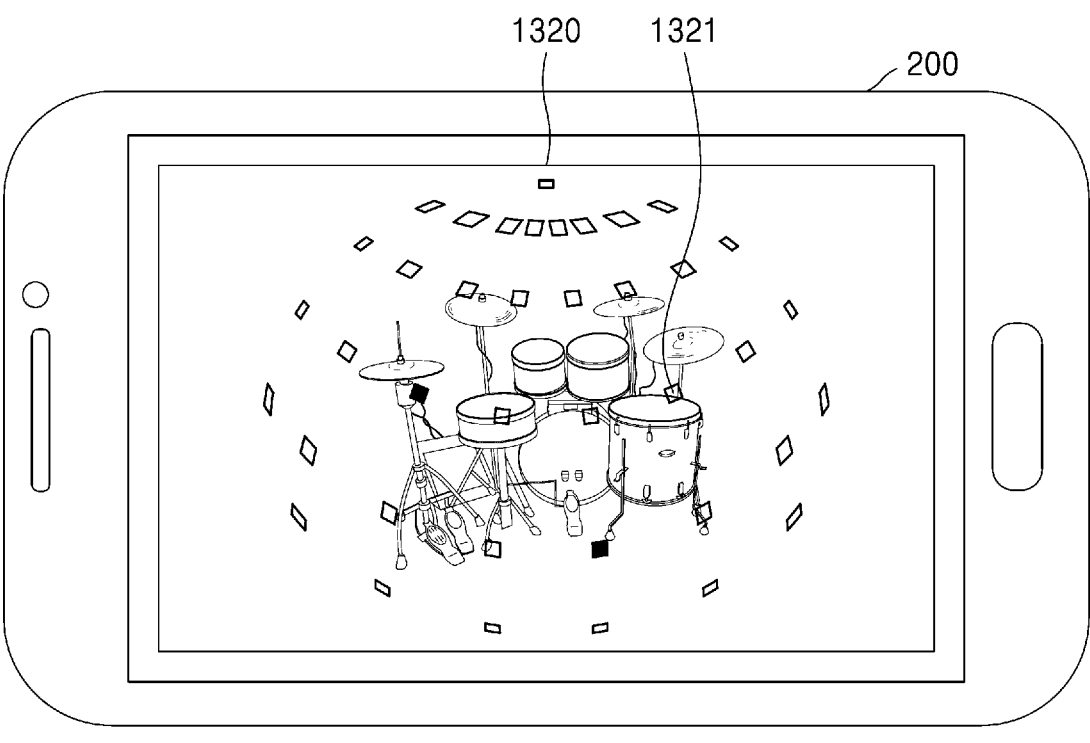

FIGS. 13A through 13C are conceptual diagrams illustrating the method of FIG. 12 of providing a re-photographing location guide. Matters of FIGS. 13A through 13C that are the same as those described above with reference to FIGS. 1 through 3 and FIGS. 11 and 12 will not be repeated herein. For convenience of description, FIGS. 13A through 13C will be described with reference to FIGS. 2A, 2B, and 12.

Referring to FIG. 13A, the electronic device 200 may display a re-photographing location guide 1310 on the display 263. The re-photographing location guide 1310 may display an image corresponding to an object that is to be photographed. The re-photographing location guide 1310 may include a plurality of components displaying a camera location in a 3D coordinate system. The plurality of components may be displayed in a form (e.g., a hemisphere form) that surrounds images corresponding to the object. At least one component requiring re-photographing among the plurality of components may be visualized in a first form 1311. For example, the first form 1311 may be expressed in a first color.

Referring to FIG. 13B, the user of the electronic device 200 may photograph the object at a camera location corresponding to the first form 1311. The electronic device 200 may obtain the second sensing data from the at least one sensor 210. The electronic device 200 may determine whether the second sensing data is a result of photographing at a first camera location where re-photographing is needed.

Referring to FIG. 13C, the electronic device 200 may display a re-photographing location guide 1320 on the display 263. When it is determined that the second sensing data is a result of photographing at the first camera location where re-photographing is needed, the electronic device 200 may provide the re-photographing location guide 1320 by changing a component visualized in the first form 1311 to a second form 1321. For example, the second form 1321 may be expressed in a second color different from the first color.

Figure 14:
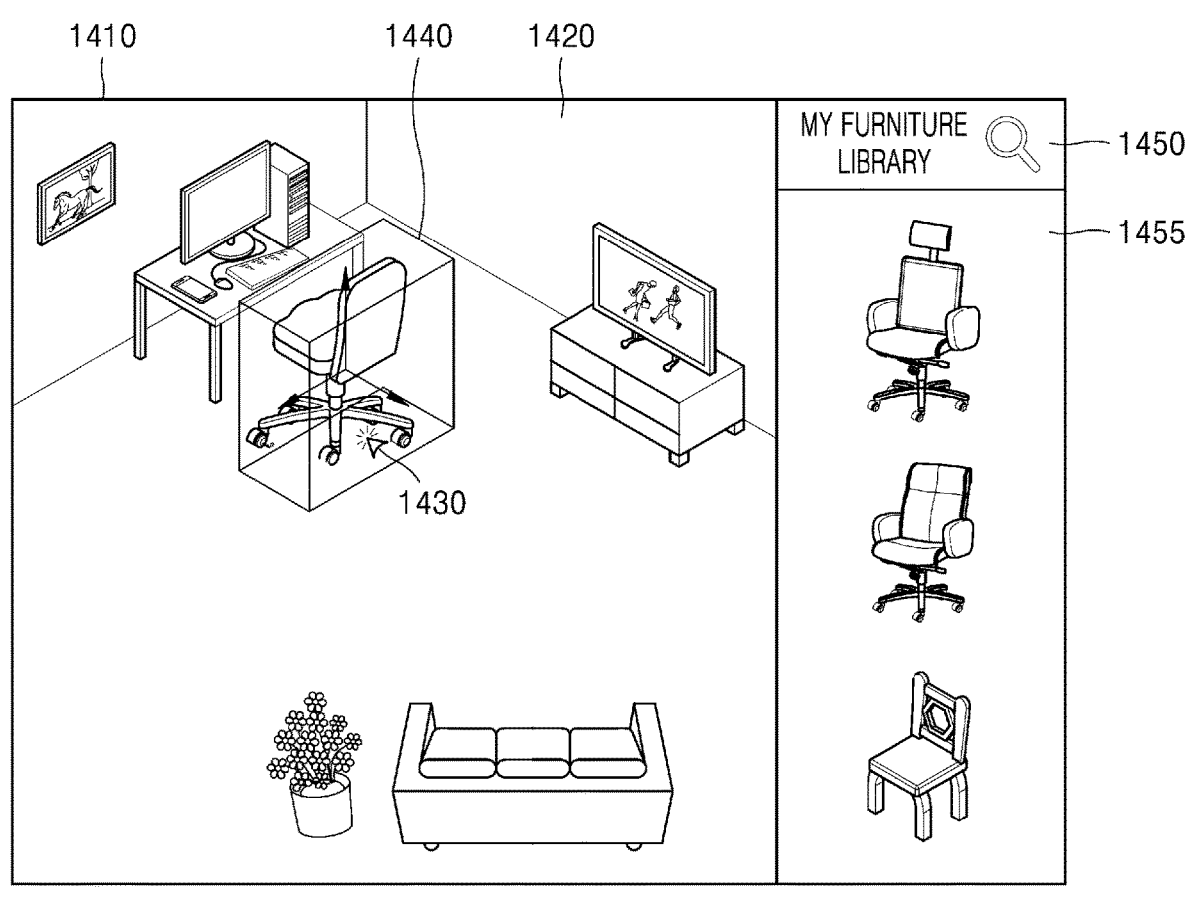
FIG. 14 illustrates a user interface for changing a furniture arrangement in a virtual space, according to an embodiment of the disclosure.

FIG. 14 illustrates a user interface for changing a furniture arrangement in a virtual space, according to an embodiment of the disclosure. Matters of FIG. 14 that are the same as those described above with reference to FIGS. 1 through 13C will not be repeated herein. For convenience of description, FIG. 14 will be described with reference to FIGS. 2A and 2B.

Referring to FIG. 14, the electronic device 200 may display a virtual space 1420 on a display 1410. For example, the virtual space 1420 may be provided through a furniture arrangement application installed on the electronic device 200. For example, the virtual space 1420 may be expressed as an augmented reality, a virtual reality, a metaverse space, and the like.

The electronic device 200 may obtain an image of an object by using at least one sensor (e.g., a camera) in order to arrange an object image identical to an object (e.g., a chair) in a real space on the virtual space 1420. For example, the electronic device 200 may obtain a point cloud corresponding to the object and apply the point cloud to a neural network model to identify whether the point cloud includes a portion that violates a predefined rule. When the point cloud includes at least one outlier point indicating a violation of a predefined rule, the electronic device 200 may provide a re-photographing location guide to the user so that the user re-photographs the object. When the point cloud does not include the at least one outlier point indicating a violation of a predefined rule, the electronic device 200 may arrange, on the virtual space 1420, an image obtained by 3D-modeling the object.

The electronic device 200 may receive a user input 1430 of selecting an object (e.g., a chair) included in the virtual space 1420. The electronic device 200 may display a 3D bounding box 1440 corresponding to the object on the display 1410, based on the user input 1430.

According to an embodiment of the disclosure, the electronic device 200 may receive a user input for moving the 3D bounding box 1440 to another location in the virtual space 1420. The electronic device 200 may display on the display 1410 an animation in which the object is moved to another location in the virtual space 1420 along with the 3D bounding box 1440.

According to an embodiment of the disclosure, the electronic device 200 may display a window 1450 including a list 1455 including objects of the same type as the selected object but having a different form, based on the user input 1430. According to an embodiment of the disclosure, at least one of the objects included in the list 1455 may be an object corresponding to the first point cloud or second point cloud described above with reference to FIGS. 1 through 13C.

According to an embodiment of the disclosure, a window 1450 may overlap a window on which the virtual space 1420 is displayed. For example, the window on which the virtual space 1420 is displayed may be reduced, and the window 1450 may be displayed in a space remaining due to the reduction. For example, the window on which the virtual space 1420 is displayed may be moved to a background, and the window 1450 may be displayed on the entire display 1410.

According to an embodiment of the disclosure, the electronic device 200 may receive a user input of selecting an object from the list 1455. An object corresponding to the user input 1430 in the virtual space 1420 may be changed to the object selected from the list 1455 and may be displayed.

The disclosure proposes a point cloud generating method in which whether a predefined rule is violated is inferred using an artificial intelligence model, and missing points are estimated based on a result of the inference to provide a re-photographing location guide.

Additional aspects will be set forth in part in the description which follows and, in part, will be apparent from the description, or may be learned by practice of the presented embodiments.

According to an embodiment of the disclosure, provided is a method, performed by an electronic device, of generating a point cloud. The method may include obtaining first sensing data corresponding to an object from at least one sensor. The method may include obtaining a first point cloud corresponding to the object, based on the first sensing data. The method may include identifying at least one outlier point in the first point cloud by using at least one artificial intelligence model. The at least one outlier point may represent a violation of at least one predefined rule. The method may include providing a location guide for re-photographing the object, based on the at least one outlier point. According to an embodiment of the disclosure, points missing from a point cloud may be quickly and accurately estimated by identifying at least one outlier point that represent violation of a predefined rule. According to an embodiment of the disclosure, additional sensing data may be effectively obtained by guiding the points missing from the point cloud.

According to an embodiment of the disclosure, the method may include obtaining second sensing data corresponding to at least a portion of the object from the at least one sensor. The method may include obtaining a second point cloud, based on the first sensing data and the second sensing data. According to an embodiment of the disclosure, a complete point cloud may be effectively generated using the additional sensing data obtained according to the re-photographing location guide.

According to an embodiment of the disclosure, the providing of the re-photographing location guide may include displaying, on a display of the electronic device, the re-photographing location guide obtained by visualizing, in a first form, a first camera location where re-photographing is needed. The providing of the re-photographing location guide may include, determining whether the second sensing data is a result of photographing at the camera location where the re-photographing is needed. The providing of the re-photographing location guide may include, based on a determination that the second sensing data is a result of photographing at the first camera location where re-photographing is needed, displaying the re-photographing location guide on the display of the electronic device by changing the first form into a second form indicating a second camera location where re-photographing is not needed.

According to an embodiment of the disclosure, additional sensing data may be effectively obtained by providing a re-photographing location guide to the user through an intuitive user interface (UI)/user experience (UX).

According to an embodiment of the disclosure, the providing of the re-photographing location guide may include estimating a location of the at least one sensor that has obtained the first sensing data, based on the first sensing data. The providing of the re-photographing location guide may include estimating a distance between the object and the at least one sensor, based on the estimated location. The providing of the re-photographing location guide may include obtaining a pixel resolution corresponding to the object, based on at least one of the estimated distance, the angle of view of the at least one sensor, or the first sensing data. The providing of the re-photographing location guide may include determining whether the pixel resolution is less than a first threshold value. The providing of the re-photographing location guide may include providing the re-photographing location guide instructing to photograph the object at a closer distance than the estimated distance, based on a determination that the pixel resolution is less than the first threshold value. According to an embodiment of the disclosure, the pixel resolution may be quickly and accurately determined.

According to an embodiment of the disclosure, the providing of the re-photographing location guide may include estimating a first location of the at least one sensor that has obtained the first sensing data, based on the first sensing data. The providing of the re-photographing location guide may include estimating a second location of the at least one sensor for obtaining second sensing data corresponding to the identified portion, based on the estimated first location. The providing of the re-photographing location guide may include obtaining a location adjustment value of the at least one sensor by comparing the first location with the second location. The providing of the re-photographing location guide may include determining whether the location adjustment value exceeds a second threshold value. The providing of the re-photographing location guide may include providing the re-photographing location guide instructing to photograph the object at the second location, based on a determination that the location adjustment value exceeds the second threshold value. According to an embodiment of the disclosure, a camera location where additional photographing is needed may be quickly and accurately ascertained.

According to an embodiment of the disclosure, the identifying of the at least one outlier point from the first point cloud may include obtaining multi-view images corresponding to the object, based on the first point cloud, and obtaining camera information corresponding to each of the multi-view images. The identifying of the at least one outlier point from the first point cloud may include inferring whether a movement of the object in a moving picture composed of the multi-view images violates the at least one predefined rule, by applying the moving picture to the at least one artificial intelligence model. The identifying of the at least one outlier point from the first point cloud may include estimating missing points in the first point cloud from the shape of the object, based on a result of the inferring. According to an embodiment of the disclosure, by generating a moving picture from a point cloud, it may be determined whether an artificial intelligence model violates a predefined rule under consistent conditions.

According to an embodiment of the disclosure, the estimating of the missing points in the first point cloud may include obtaining a heat map corresponding to the result of the inferring from the moving picture. The estimating of the missing points in the first point cloud may include estimating the missing points in the first point cloud from the shape of the object, based on the heat map and the camera information. The estimating of the missing points in the first point cloud may include determining whether a confidence value of a result of the estimation is less than a third threshold value. The estimating of the missing points in the first point cloud may include additionally obtaining the multi-view images when the confidence value is less than the third threshold value. According to an embodiment of the disclosure, reliability of inference using a artificial intelligence model may be increased.

According to an embodiment of the disclosure the inferring of whether the movement of the object in the moving picture violates the at least one predefined rule may include perceiving an object in a first frame of the moving picture. The inferring of whether the movement of the object in the moving picture violates the at least one predefined rule may include obtaining a prediction value of a second frame that is a frame next to the first frame, based on a result of the perceiving. The inferring of whether the movement of the object in the moving picture violates the at least one predefined rule may include determining whether an error between the prediction value of the second frame and an actual value of the second frame exceeds a fourth threshold value. The inferring of whether the movement of the object in the moving picture violates the at least one predefined rule may include determining that the movement of the object violates the at least one predefined rule, when the error is greater than the fourth threshold value, and determining that the movement of the object does not violate the at least one predefined rule, when the error is less than or equal to the fourth threshold value. According to an embodiment of the disclosure, the reliability of inference as to whether a predefined rule is violated may be increased.

According to an embodiment of the disclosure, the at least one predefined rule comprises at least one of object persistence, solidity, unchangeableness, or directional inertia. However, the disclosure is not limited thereto.

According to an embodiment of the disclosure, a predefined rule of which violation or non-violation is inferred by at least one artificial intelligence model may be defined in advance among several predefined rules according to a user or a manufacturer's setting.

According to an embodiment of the disclosure, the at least one artificial intelligence model may be trained to, by using, as training data, a data set including an image sequence that violates the at least one predefined rule and an image sequence that does not violate the at least one predefined rule, infer whether a movement of an object in the image sequence violates the at least one predefined rule.

According to an embodiment of the disclosure, provided is a non-transitory computer-readable recording medium having recorded thereon a computer program, which, when executed by a computer, performs the method.

According to an embodiment of the disclosure, provided is an electronic device for generating a point cloud. The electronic device may include at least one sensor. The electronic device may include a memory that stores one or more instructions. The electronic device may include at least one processor configured to execute the one or more instructions stored in the memory. The at least one processor may be configured to execute the one or more instructions to obtain first sensing data corresponding to an object from the at least one sensor. The at least one processor may be further configured to execute the one or more instructions to obtain a first point cloud corresponding to the object, based on the first sensing data. The at least one processor may be further configured to execute the one or more instructions to identify at least one outlier point in the first point cloud by using at least one artificial intelligence model. The at least one outlier point may represent a violation of at least one predefined rule. The at least one processor may be further configured to execute the one or more instructions to provide a location guide for re-photographing the object based on the at least one outlier point.

The at least one processor may be further configured to execute the one or more instructions to, after providing the re-photographing location guide, obtaining second sensing data corresponding to at least a portion of the object from the at least one sensor. The at least one processor may be further configured to execute the one or more instructions to obtain a second point cloud, based on the first sensing data and the second sensing data.

According to an embodiment of the disclosure, the electronic device may include a display. The at least one processor may be further configured to execute the one or more instructions to display, on the display, the re-photographing location guide obtained by visualizing, in a first form, a first camera location where re-photographing is needed. The at least one processor may be further configured to execute the one or more instructions to, after obtaining the second sensing data, determine whether the second sensing data is a result of photographing at the camera location where the re-photographing is needed. The at least one processor may be further configured to execute the one or more instructions to, based on a determination that the second sensing data is a result of photographing at the first camera location where re-photographing is needed, display the re-photographing location guide on the display by changing the first form into a second form indicating a second camera location where re-photographing is not needed.

According to an embodiment of the disclosure, the at least one processor may be further configured to execute the one or more instructions to estimate a location of the at least one sensor that has obtained the first sensing data, based on the first sensing data. The at least one processor may be further configured to execute the one or more instructions to estimate a distance between the object and the at least one sensor, based on the estimated location. The at least one processor may be further configured to execute the one or more instructions to obtain a pixel resolution corresponding to the object, based on at least one of the estimated distance, the angle of view of the at least one sensor, or the first sensing data. The at least one processor may be further configured to execute the one or more instructions to determine whether the pixel resolution is less than a first threshold value. The at least one processor may be further configured to execute the one or more instructions to provide the re-photographing location guide instructing to photograph the object at a closer distance than the estimated distance, when the pixel resolution is less than the first threshold value.

According to an embodiment of the disclosure, the at least one processor may be further configured to execute the one or more instructions to estimate a first location of the at least one sensor that has obtained the first sensing data, based on the first sensing data. The at least one processor may be further configured to execute the one or more instructions to estimate a second location of the at least one sensor for obtaining second sensing data corresponding to the identified portion, based on the estimated first location. The at least one processor may be further configured to execute the one or more instructions to obtain a location adjustment value of the at least one sensor by comparing the first location with the second location. The at least one processor may be further configured to execute the one or more instructions to determine whether the location adjustment value exceeds a second threshold value. The at least one processor may be further configured to execute the one or more instructions to provide the re-photographing location guide instructing to photograph the object at the second location, when the location adjustment value exceeds the second threshold value.

According to an embodiment of the disclosure, the at least one processor may be further configured to execute the one or more instructions to obtain multi-view images corresponding to the object, based on the first point cloud, and obtain camera information corresponding to each of the multi-view images. The at least one processor may be further configured to execute the one or more instructions to infer whether a movement of the object in a moving picture composed of the multi-view images violates the at least one predefined rule, by applying the moving picture to the at least one artificial intelligence model. The at least one processor may be further configured to execute the one or more instructions to estimate missing points in the first point cloud from a shape of the object, based on a result of the inferring.

The at least one processor may be further configured to execute the one or more instructions to obtain a heat map corresponding to the result of the inferring from the moving picture. The at least one processor may be further configured to execute the one or more instructions to estimate the missing points in the first point cloud from the shape of the object, based on the heat map and the camera information. The at least one processor may be further configured to execute the one or more instructions to determine whether a confidence value of the result of the estimation is less than a third threshold value. The at least one processor may be further configured to execute the one or more instructions to additionally obtain the multi-view images when the confidence value is less than the third threshold value.

According to an embodiment of the disclosure, the at least one processor may be further configured to execute the one or more instructions to perceive an object in a first frame of the moving picture, and the at least one processor may be further configured to execute the one or more instructions to obtain a prediction value of a second frame that is a frame next to the first frame, based on a result of the perception. The at least one processor may be further configured to execute the one or more instructions to determine whether an error between the prediction value of the second frame and an actual value of the second frame exceeds a fourth threshold value. The at least one processor may be further configured to execute the one or more instructions to determine that the movement of the object violates the at least one predefined rule, when the error is greater than the fourth threshold value, and determine that the movement of the object does not violate the at least one predefined rule, when the error is less than or equal to the fourth threshold value.

According to an embodiment of the disclosure, the at least one artificial intelligence model may be trained to, by using, as training data, a data set including an image sequence that violates the at least one predefined rule and an image sequence that does not violate the at least one predefined rule, infer whether a movement of an object in the image sequence violates the at least one predefined rule.

Embodiments of the disclosure can also be embodied as a storage medium including instructions executable by a computer such as a program module executed by the computer. A computer readable medium can be any available medium which can be accessed by the computer and includes all volatile/non-volatile and removable/non-removable media. Further, the computer readable medium may include all computer storage and communication media. The computer storage medium includes all volatile/non-volatile and removable/non-removable media embodied by a certain method or technology for storing information such as computer readable instruction code, a data structure, a program module or other data. Communication media may typically include computer readable instructions, data structures, or other data in a modulated data signal, such as program modules.

A computer- or machine-readable storage medium may be provided as a non-transitory storage medium. The 'non-transitory storage medium' is a tangible device and only means that it does not contain a signal (e.g., electromagnetic waves). This term does not distinguish a case in which data is stored semi-permanently in a storage medium from a case in which data is temporarily stored. For example, the non-transitory recording medium may include a buffer in which data is temporarily stored.

According to an embodiment of the disclosure, a method according to various disclosed embodiments may be provided by being included in a computer program product. The computer program product, which is a commodity, may be traded between sellers and buyers. Computer program products are distributed in the form of device-readable storage media (e.g., compact disc read only memory (CD-ROM)), or may be distributed (e.g., downloaded or uploaded) through an application store or between two user devices (e.g., smartphones) directly and online. In the case of online distribution, at least a portion of the computer program product (e.g., a downloadable app) may be stored at least temporarily in a device-readable storage medium, such as a memory of a manufacturer's server, a server of an application store, or a relay server, or may be temporarily generated.

While the disclosure has been particularly shown and described with reference to exemplary embodiments thereof, it will be understood that various changes in form and details may be made therein without departing from the spirit and scope of the disclosure. Thus, the above-described embodiments should be considered in descriptive sense only and not for purposes of limitation. For example, each component described as a single type may be implemented in a distributed manner, and similarly, components described as being distributed may be implemented in a combined form.

The scope of the disclosure is indicated by the scope of the claims to be described later rather than the above detailed description, and all changes or modified forms derived from the meaning and scope of the claims and the concept of equivalents thereof should be interpreted as being included in the scope of the disclosure.

What is claimed is:

1. A method, performed by an electronic device, of generating a point cloud, the method comprising:
    obtaining, from at least one sensor of the electronic device, first sensing data corresponding to an object;
    obtaining a first point cloud corresponding to the object, based on the first sensing data;
    identifying, by using at least one artificial intelligence model, at least one outlier point indicating violation of at least one predefined rule in the first point cloud; and providing a re-photographing location guide for re-pho-tographing the object, based on the at least one outlier point, wherein the at least one artificial intelligence model is trained to infer whether a movement of the object in an image sequence violates the at least one predefined rule.

2. The method of claim 1, further comprising:

obtaining, from the at least one sensor, second sensing data corresponding to at least a portion of the object that is re-photographed based on the re-photographing location guide; and obtaining a second point cloud, based on the first sensing data and the second sensing data.

3. The method of claim 2, wherein the providing the re-photographing location guide comprises:

displaying, on a display of the electronic device, the re-photographing location guide obtained by visualiz-ing, in a first form, a first camera location where the re-photographing is needed;

determining whether the second sensing data is a result of photographing at the first camera location where the re-photographing is needed; and based on a determination that the second sensing data is captured at the first camera location where the re-photographing is needed, displaying the re-photograph-ing location guide on the display of the electronic device by changing the first form into a second form indicating a second camera location where the re-photographing is not needed.

4. The method of claim 3, wherein the providing the re-photographing location guide comprises:

estimating a location of the at least one sensor that has obtained the first sensing data, based on the first sensing data;

estimating a distance between the object and the at least one sensor, based on the estimated location;

obtaining a pixel resolution corresponding to the object, based on at least one of the estimated distance, an angle of view of the at least one sensor, or the first sensing data;

determining whether the pixel resolution is less than a first threshold value; and based on a determination that the pixel resolution is less than the first threshold value, providing the re-photo-graphing location guide instructing to photograph the object at a closer distance than the estimated distance.

5. The method of claim 4, wherein the providing of the re-photographing location guide comprises:

estimating a first location of the at least one sensor, based on the first sensing data;

estimating a second location of the at least one sensor for obtaining the second sensing data corresponding to the at least one outlier point, based on the estimated first location;

obtaining a location adjustment value of the at least one sensor by comparing the first location with the second location;

determining whether the location adjustment value exceeds a second threshold value; and based on a determination that the location adjustment value exceeds the second threshold value, providing the re-photographing location guide instructing to photo-graph the object at the second location.

6. The method of claim 5, wherein the identifying the at least one outlier point from the first point cloud comprises:

obtaining multi-view images corresponding to the object, based on the first point cloud, and obtaining camera information corresponding to each of the multi-view images;

inferring whether the movement of the object in a moving picture comprising the multi-view images violates the at least one predefined rule, by applying the moving picture to the at least one artificial intelligence model; and estimating missing points in the first point cloud from a shape of the object, based on a result of the inferring.

7. The method of claim 6, wherein the estimating of the missing points in the first point cloud from the shape of the object comprises:

obtaining a heat map corresponding to the result of the inferring from the moving picture;

estimating the missing points in the first point cloud from the shape of the object, based on the heat map and the camera information;

determining whether a confidence value of a result of the estimating the missing points in the first point cloud from the shape of the object is less than a third threshold value; and based on a determination that the confidence value is less than the third threshold value, obtaining the multi-view images.

8. The method of claim 7, wherein the inferring whether the movement of the object in the moving picture violates the at least one predefined rule comprises:

perceiving the object in a first frame of the moving picture;

obtaining a prediction value of a second frame that is a frame next to the first frame, based on a result of the perceiving;

determining whether an error between the prediction value of the second frame and an actual value of the second frame exceeds a fourth threshold value;

based in a determination that the error is greater than the fourth threshold value, determining that the movement of the object violates the at least one predefined rule; and based on a determination that the error is less than or equal to the fourth threshold value, determining that the movement of the object does not violate the at least one predefined rule.

9. The method of claim 8, wherein the at least one predefined rule comprises at least one of object persistence, solidity, unchangeableness, or directional inertia.

10. The method of claim 1, wherein the at least one artificial intelligence model is trained by using, as training data, a data set including the image sequence that violates the at least one predefined rule and the image sequence that does not violate the at least one predefined rule.

11. An electronic device for generating a point cloud, the electronic device comprising:

at least one sensor;

a memory storing one or more instructions; and at least one processor configured to execute the one or more instructions to:

obtain, from the at least one sensor, first sensing data corresponding to an object;

obtain a first point cloud corresponding to the object, based on the first sensing data;

identify, by using at least one artificial intelligence model, at least one outlier point indicating violation of at least one predefined rule in the first point cloud; and provide a re-photographing location guide for re-photographing the object, based on the at least one outlier point, wherein the at least one artificial intelligence model is trained to infer whether a movement of the object in an image sequence violates the at least one predefined rule.

12. The electronic device of claim 11, wherein the at least one processor is configured to execute the one or more instructions to:

obtain, from the at least one sensor, second sensing data corresponding to at least a portion of the object, based on the re-photographing location guide; and obtain a second point cloud, based on the first sensing data and the second sensing data.

13. The electronic device of claim 12, further comprising a display, wherein the at least one processor is configured to execute the one or more instructions to:

display, on the display, the re-photographing location guide obtained by visualizing, in a first form, a first camera location where the re-photographing is needed;

determine whether the second sensing data is a result of photographing at the first camera location where the re-photographing is needed; and based on a determination that the second sensing data is the result of photographing at the first camera location where the re-photographing is needed, display the re-photographing location guide on the display by changing the first form into a second form indicating a second camera location where the re-photographing is not needed.

14. The electronic device of claim 13, wherein the at least one processor is configured to execute the one or more instructions to:

estimate a location of the at least one sensor that has obtained the first sensing data, based on the first sensing data;

estimate a distance between the object and the at least one sensor, based on the estimated location;

obtain a pixel resolution corresponding to the object, based on at least one of the estimated distance, an angle of view of the at least one sensor, or the first sensing data;

determine whether the pixel resolution is less than a first threshold value; and based on a determination that the pixel resolution is less than the first threshold value, provide the re-photographing location guide instructing to photograph the object at a closer distance than the estimated distance.

15. A non-transitory computer-readable recording medium having recorded thereon a computer program which is executable by a computer to perform the method of claim 1.

* * * * *